(12) United States Patent
Iguchi et al.

(10) Patent No.: US 6,988,862 B1
(45) Date of Patent: Jan. 24, 2006

(54) RIVET, RIVETED JOINT STRUCTURE RIVETING APPARATUS, AND RIVETING METHOD

(75) Inventors: Hiroyuki Iguchi, Okazaki (JP); Natsushige Sano, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 280 days.

(21) Appl. No.: 10/111,086

(22) PCT Filed: Oct. 17, 2000

(86) PCT No.: PCT/IB00/01482

§ 371 (c)(1),
(2), (4) Date: Apr. 19, 2002

(87) PCT Pub. No.: WO01/30516

PCT Pub. Date: May 3, 2001

(30) Foreign Application Priority Data

| Oct. 26, 1999 | (JP) | ................................. 11/304344 |
| Nov. 4, 1999 | (JP) | ................................. 11/313354 |
| Nov. 5, 1999 | (JP) | ................................. 11/314762 |

(51) Int. Cl.
*F16B 19/08* (2006.01)

(52) U.S. Cl. ...................... 411/501; 29/524.1

(58) Field of Classification Search ................ 411/179, 411/180, 181, 500, 501–507; 29/525.06, 29/524.01, 524.1
See application file for complete search history.

(56) References Cited

U.S. PATENT DOCUMENTS

| 2,194,458 | A |   | 3/1940  | Eckler |
| 2,361,770 | A | * | 10/1944 | Huck ........................... 470/29 |
| 3,209,446 | A | * | 10/1965 | Nicholas ...................... 29/434 |
| 4,130,369 | A | * | 12/1978 | Wojcik ........................ 403/297 |
| 4,177,545 | A | * | 12/1979 | Lambertz ................. 411/501 X |
| 4,202,243 | A | * | 5/1980  | Leonhardt ................... 411/501 |
| 4,479,915 | A | * | 10/1984 | Tsubouchi et al. .......... 264/249 |
| 4,767,248 | A |   | 8/1988  | Pratt |
| 5,564,873 | A | * | 10/1996 | Ladouceur et al. ..... 411/179 X |
| 5,613,815 | A | * | 3/1997  | Muller ....................... 411/181 |
| 5,957,777 | A |   | 9/1999  | Singh et al. |
| 6,325,584 | B1 | * | 12/2001 | Marko et al. ............... 411/501 |
| 6,338,601 | B1 | * | 1/2002  | Mauer et al. ............... 411/503 |

FOREIGN PATENT DOCUMENTS

| DE | 297 02 834 U1 | 7/1997 |
| DE | 197 26 457 A1 | 1/1998 |
| DE | 197 01 780 A1 | 7/1998 |
| EP | 0 129 358 A1 | 12/1984 |
| EP | 0 885 672 A2 | 12/1998 |
| FR | 1 300 424 A | 12/1962 |
| GB | 1 326 762 | 8/1973 |
| JP | S 04-001353 | 3/1929 |
| JP | U 37-025317 | 9/1962 |

(Continued)

*Primary Examiner*—Flemming Saether
(74) *Attorney, Agent, or Firm*—Oliff & Berridge, PLC

(57) ABSTRACT

A rivet is provided which includes axially opposite end portions at least one of which is more likely to be deformed radially outwards than a remaining portion thereof, and the remaining portion is more resistant to a load applied in an axial direction of the rivet than the axially opposite end portions. As one example, the rivet includes a head portion and a cylindrical portion that extends from the head portion, and a recess is formed in the head portion so as to be open to a top surface of the head portion.

6 Claims, 28 Drawing Sheets

FOREIGN PATENT DOCUMENTS

| | | |
|---|---|---|
| JP | B 47-036062 | 9/1972 |
| JP | U 49-065879 | 6/1974 |
| JP | A 49-116442 | 11/1974 |
| JP | U 50-137470 | 11/1975 |
| JP | U 50-1355869 | 11/1975 |
| JP | U 52-106758 | 2/1976 |
| JP | U 57-205418 | 12/1982 |
| JP | U 59-175704 | 11/1984 |
| JP | U 60-043710 | 3/1985 |
| JP | A 63-72445 | 4/1988 |
| JP | U 64-007911 | 1/1989 |
| JP | U 2-50507 | 4/1990 |
| JP | U 2-66707 | 5/1990 |
| JP | U 3-39609 | 4/1991 |
| JP | U 4-14806 | 2/1992 |
| JP | A 8-4732 | 1/1996 |
| JP | A 09-014230 | 1/1997 |
| JP | A 9-317730 | 12/1997 |
| JP | A 09-317730 | 12/1997 |
| JP | A 10-78015 | 3/1998 |
| JP | A 11-33664 | 2/1999 |
| JP | A 11-153114 | 6/1999 |
| JP | U 02-084009 | 6/1999 |
| JP | B2 2958272 | 7/1999 |
| WO | WO 93/10925 | 6/1993 |
| WO | WO 98/01679 | 1/1998 |
| WO | WO 98/31487 | 7/1998 |
| WO | WO 00/29145 | 5/2000 |

\* cited by examiner

RIVET, RIVETED JOINT STRUCTURE RIVETING APPARATUS, AND RIVETING METHOD

FIELD OF THE INVENTION

The present invention relates to a rivet, a riveted joint structure, a riveting apparatus, and a riveting method. More particularly, the present invention relates to a rivet, riveted joint structure, a riveting apparatus, and a riveting method, which are used in or applied to a vehicle body of an automobile, or the like.

BACKGROUND OF THE INVENTION

A known example of a riveted joint structure and a riveting method applied to a vehicle body of an automobile, or the like, is disclosed in Japanese Laid-open Patent Publication No. HEI 8-4732.

As shown in FIG. 1, a rivet 150 used in this riveted joint structure is a hollow rivet that consists of a head portion 152 and a cylindrical portion 154 extending from the lower surface of the head portion 152. A distal end portion 154A of the cylindrical portion 154 is inclined with an acute angle formed at its outer periphery, such that the distal end portion 154A is tapered inwards from its outer edge toward its inner edge. With the distal end portion 154A thus formed, the rivet 150 can easily enter or pierce a metal plate or plates with improved efficiency.

In this riveted joint structure, however, when the rivet 150 is inserted into two plates 156 and 158 as a workpiece as shown in FIG. 2, the plate 156 against which the rivet is first pressed is bent and deformed. As a result, a clearance or gap 160 is formed between the head portion 152 of the rivet 150 and the plate 156, thus deteriorating the strength.

Another known example of the riveted joint structure and riveting method applied to a vehicle body of an automobile, or the like, is disclosed in WO 98/31487 published on 23 Jul. 1998.

As shown in FIG. 3A, the rivet disclosed in the above publication is a self-piercing tube-like rivet, which has a cylindrical rivet body 200. As shown in FIG. 3B, axially opposite end portions 200A and 200B have inner circumferential surfaces that are inclined in a direction in which the rivet is driven or inserted into a workpiece, so that the driving load, or the force required to drive the rivet into the workpiece, can be reduced.

In the above-described riveted joint structure, however, the rivet body 200 has a uniform strength over the entire length thereof. In this case, if the strength of the rivet body 200 is increased so as to prevent unnecessary deformation, such as buckling of a middle portion 200C, upon driving of the rivet into the workpiece, the axially opposite end portions 200A, 200B and their vicinities are not sufficiently deformed, resulting in reduced joining or fastening force. On the other hand, if the strength of the rivet body 200 is lowered so as to sufficiently deform the opposite end portions 200A, 200B and their vicinities, thereby to enhance the fastening force, the middle portion 200C suffers from buckling, or the like, upon driving of the rivet into the workpiece. It is thus difficult to achieve both a desired efficiency in driving the rivet into the workipiece, and desired deformation characteristics of the rivet, and is also difficult to provide a sufficiently large fastening or joining force at the same time.

Another known example of a rivet structure used in a vehicle body of an automobile, or the like, is disclosed in Japanese Laid-open Patent Publication No. HEI 2-66707.

In the rivet structure disclosed in the above publication and also shown in FIG. 4, a rivet 300 consists of a head portion 302 and a rod portion 304 extending from the lower surface of the head portion 302. As shown in FIG. 5, the rod portion 304 is formed on its outer circumferential surface with saw-toothed protrusions 306 each having a triangular cross section in a plane perpendicular to the longitudinal direction of the rod portion 304. After the rivet 300 is inserted or set into a workpiece, therefore, the protrusions 306 of the rivet 300 engage with the workpiece, thus preventing the rivet 300 from rotating.

In the rivet structure, however, the protrusions 306 are formed with the same height over the entire length in the longitudinal direction of the rod portion 304, and the distal end 304A of the rod portion 304 has a relatively large area. Thus, a large driving force is required for driving the rivet 300 into a workpiece to be fastened, since the distal end 304 of the rod portion 304 receives large resistance force from the workpiece. Furthermore, the distal end 304*a* is less likely to deform radially outwardly of the rod portion 304 because of the protrusions 306, and a large driving force is required for this reason as well. Thus, the rivet as shown in FIGS. 4 and 5 is driven into a workpiece with a poor efficiency.

SUMMARY OF THE INVENTION

In view of the above-described situations, it is an object of the present invention to provide a rivet, a riveted joint structure, a riveting apparatus, and a riveting method, which can provide improved fastening strength.

It is another object of the present invention to provide a rivet structure that enables a rivet to be driven into a workpiece with improved efficiency and ease.

According to the first aspect of the present invention, there is provided a rivet which includes axially opposite end portions at least one of which is more likely to be deformed radially outwards than a remaining portion thereof, the remaining portion being more resistant to a load applied in an axial direction of the rivet than said axially opposite end portion.

In one preferred form of the first aspect of the invention, the rivet comprises a head portion including one of the axially opposite end portions, and a cylindrical portion including the other of the axially opposite end portions, and a recess is formed in the head portion to be open to a top surface of the head portion. In addition, a bore may be formed in the cylindrical portion, and a projection may be formed on a bottom wall of the bore.

Wheh the rivet-constructed as described above is driven into a workpiece, or after the rivet is driven into the workpiece, a clearance between the head portion of the rivet and the workpiece (e.g., plate) can be eliminated by applying a pressure to walls of the recess formed in the head portion of the rivet and the projection formed on the bottom of the cylindrical portion. This results in improved fastening or joining strength.

In another preferred form of the first aspect of the present invention, the rivet includes at least one deformation-restrained portion that is unlikely to undergo plastic deformation. The deformation-restrained portion may be substantially located at an axially middle portion of the rivet.

In a further preferred form of the first aspect of the invention, the rivet includes a head portion, and a cylindrical portion that extends from the head portion in an axial direction of the rivet, wherein a projection is provided on an outer circumferential surface of the cylindrical portion such that the projection extends in a longitudinal direction of the cylindrical portion, and the projection includes an upwardly inclined portion whose height as measured from the outer circumferential surface of the cylindrical portion gradually increases from one of longitudinally opposite ends thereof that is closer to a distal end of the cylindrical portion, to the other end that is closer to the head portion of the rivet.

According to the second aspect of the present invention, there is provided a method of fastening a workpiece, using a rivet comprising a head portion having a recess formed therein, and a cylindrical portion that extends from the head portion, characterized by comprising the steps of: driving the rivet into the workpiece; and expanding a portion of the head portion that surrounds the recess such that that portion of the head portion splays radially outwards.

With the method as described above, a clearance between the head portion of the rivet and the workpiece (e.g., plate) can be eliminated by expanding the portion of the head portion that surrounds the recess during or after insertion of the rivet into the workpiece. As a result, the fastening strength of the rivet is enhanced.

According to the third aspect of the present invention, there is provided a riveting apparatus using a rivet having a tubular body, which comprises a punch that is operable to drive the rivet into a workpiece, the punch comprising a load-transmitting portion that transmits a driving load to be applied to the rivet, and a guide portion that holds the rivet, the load-transmitting portion and the guide portion being movable relative to each other in a direction in which the rivet is driven into the workpiece, during driving of the rivet into the workpiece.

With the riveting apparatus as described above, the load-transmitting portion and the guide portion of the punch are moved relative to each other during insertion of the rivet into a workpiece, so that the rivet body can be driven into the workpiece with a certain portion of the rivet being made unlikely to deform and another portion(s) being effectively deformed. Thus, the rivet body can be driven into the workpiece with improved efficiency and ease, while assuring desired deformation characteristics and sufficiently large fastening force or strength.

According to the fourth aspect of the invention, there is provided a method for fastening a workpiece using a rivet having a tubular body characterized by comprising steps of driving the rivet into the workpiece with a punch, deforming axially opposite end portions of the rivet, and punching out a portion of the workpiece located inside the tubular body of the rivet during one reciprocation movement of the punch.

DETAILED DESCRIPTION OF THE PREFERRED EMBODIMENTS

A first embodiment of the first and second aspects of the present invention will be explained with reference to FIGS. 6A to 6C and 7.

Figure 7:
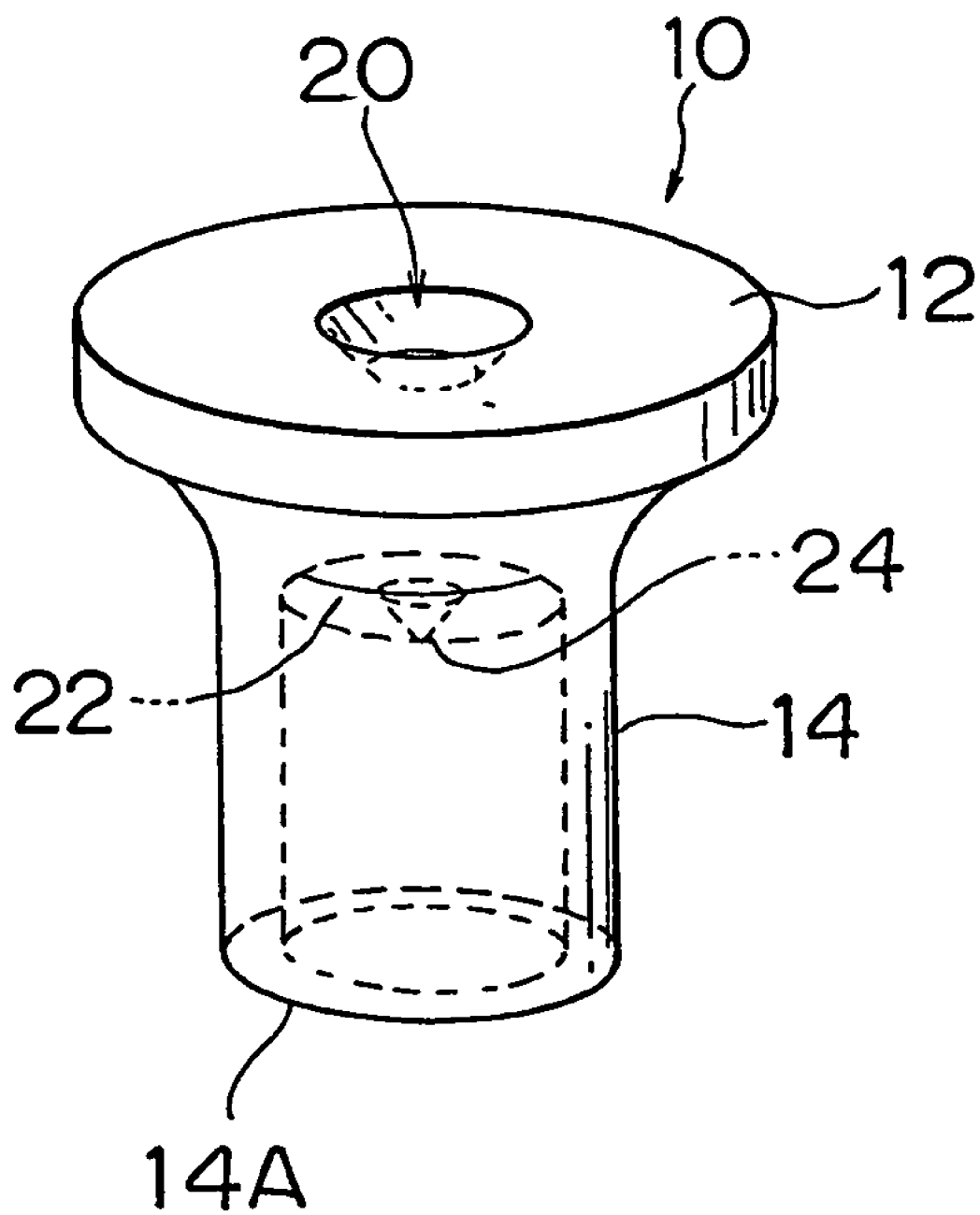
FIG. 7 is a perspective view showing the rivet of the first embodiment of the present invention.

As shown in FIG. 7, a rivet 10 of the present embodiment is a hollow rivet that consists of a head portion 12, and a cylindrical portion 14 extending from the back surface of the head 12. The head portion 12 of the rivet 10 is formed at its substantially central portion with a recess 20 having an inverted, truncated conical shape. Also, a projection 24 having a conical shape is formed on a bottom 22 A of the cylindrical portion 14 of the rivet 10.

Figure 1:
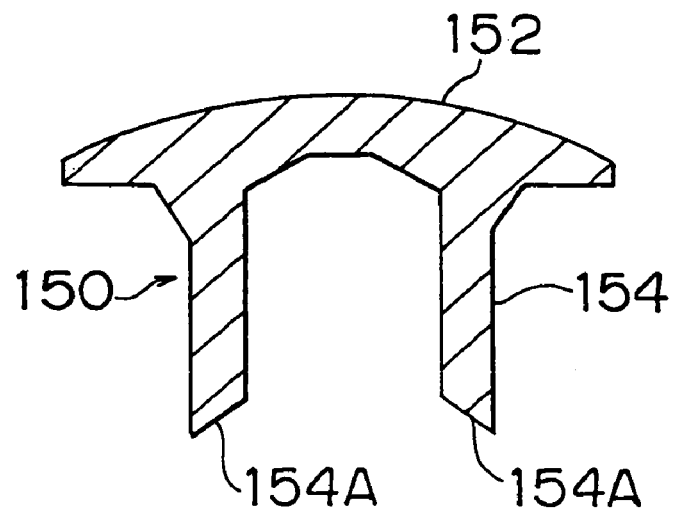
FIG. 1 is a side cross-sectional view showing a known example of rivet.
Figure 2:
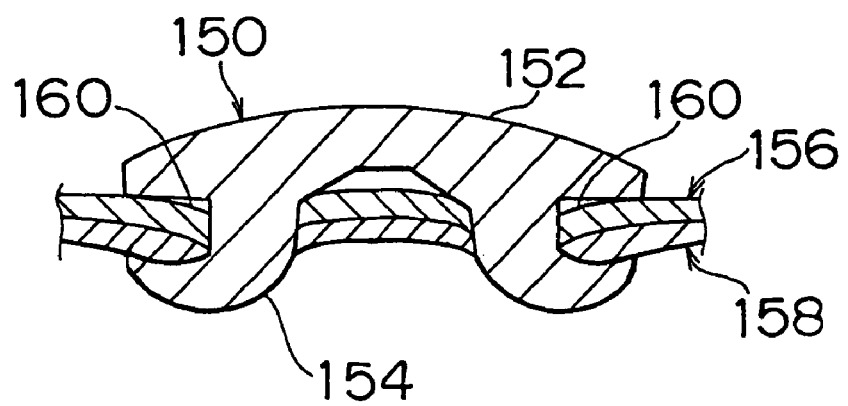
FIG. 2 is a side cross-sectional view showing a riveted joint structure using the known rivet.
Figure 3A:
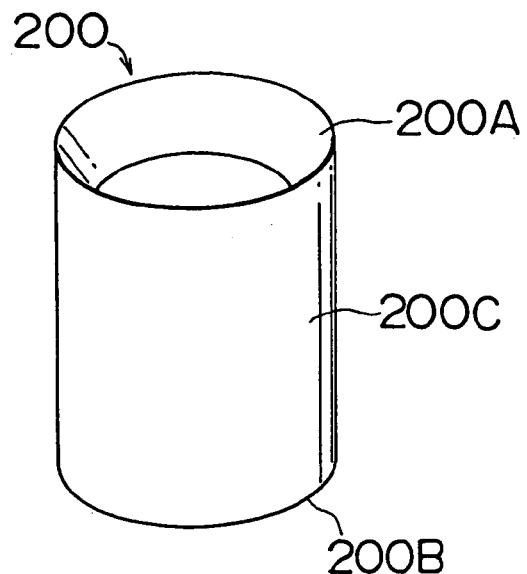
FIG. 3A is a perspective view showing a rivet body of another known example.
Figure 3B:
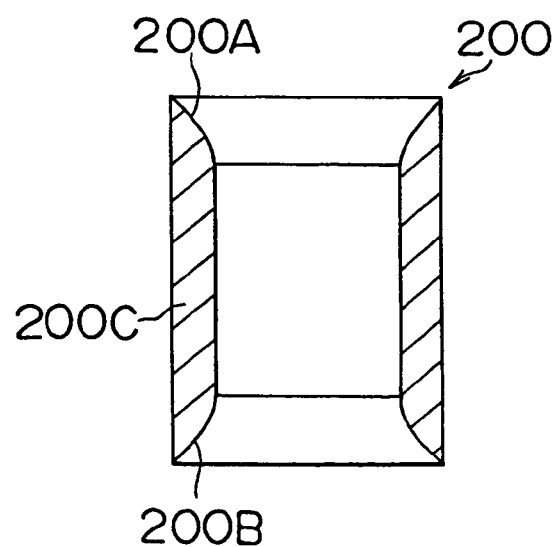
FIG. 3B is a side cross-sectional view showing the rivet body of the known example of FIG. 3A.
Figure 4:
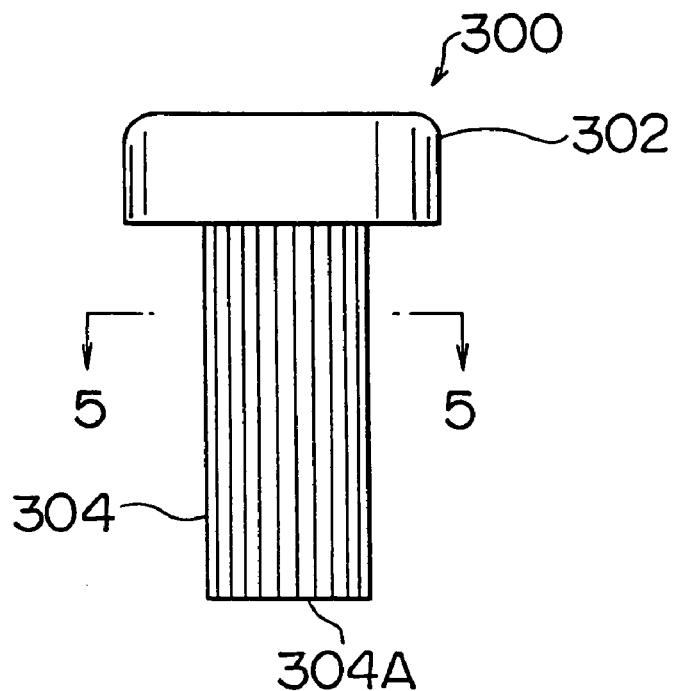
FIG. 4 is a side view showing a further known example of rivet.
Figure 5:
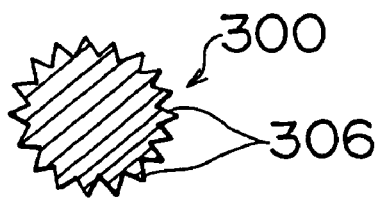
FIG. 5 is a cross-sectional view taken along line 5—5 in FIG. 4.
Figure 6A:
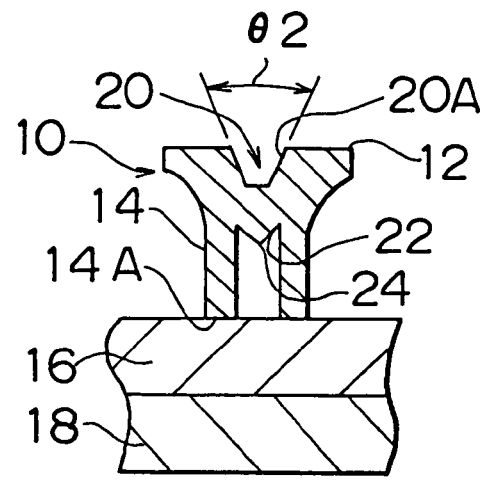
FIG. 6A is a side cross-sectional view showing a rivet according to the first embodiment of the first and second aspects of the present invention before the rivet is driven into a workpiece.

A riveting or fastening method using the rivet of the present embodiment will be now explained. Initially, as shown in FIG. 6A, a distal end 14A of the cylindrical portion 14 of the rivet 10 is positioned on one (16) of two plates 16 and 18 to be fastened.

Figure 6B:
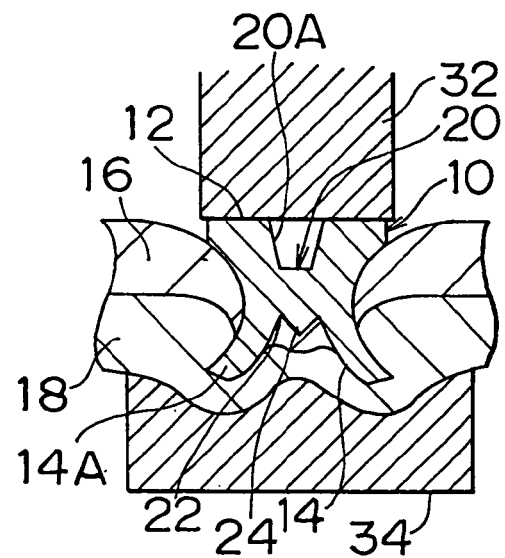
FIG. 6B is a side cross-sectional view showing the rivet of the first embodiment when it is being driven into the workpiece.

Next, as shown in FIG. 6B, the head portion 12 of the rivet 10 is pressed or driven by a first punch 32 so that a die 34 disposed on the side of the plate 18 causes a distal end portion 14A of the cylindrical portion 14 of the rivet 10 to deform radially outwards.

Figure 6C:
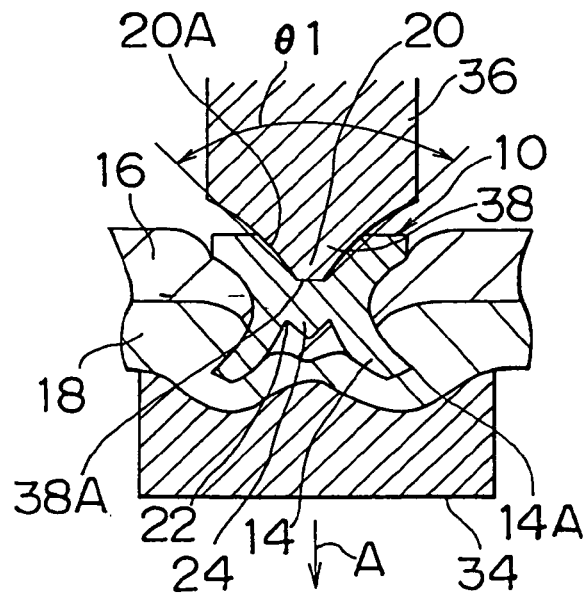
FIG. 6C is a side cross-sectional view showing the rivet of the first embodiment after it is driven into the workpiece.

Next, as shown in FIG. 6C, the head portion 12 of the rivet 10 is pressed or driven by a second punch 36. The second punch 36 has a generally truncated conical projection 38 formed in its distal end portion, and the opening angle θ of the projection 38 is set greater than the opening angle θ of the recess 20 formed in the rivet 10 (θ1>θ2). When the second punch 36 is pressed against the head portion 12 of the rivet 10, therefore, an outer circumferential wall 20A of the recess 20 formed on the head portion 12 expands radially outwards. Furthermore, a distal end 38A of the projection 38 applies a pressure on a bottom wall 20B of the recess 20 in an axial direction of the cylindrical portion 14 (direction of arrow A in FIG. 6C), so that the cylindrical portion 14 expands radially outwards.

The effects of the present embodiment will be explained.

In the present embodiment, after the rivet 10 is driven into the plates 16 and 18, the projection 38 of the second punch 36 is pressed against the wall of the recess 20 formed in the head portion 12 of the rivet 10, so that the outer circumferential wall 20A of the recess 20 expands outwards. As a result, any clearance or gap between the head portion 12 of the rivet 10 and the plate 16 can be eliminated, thus assuring an increased strength with which the plates 16, 18 are joined or fastened together.

Further, in the present embodiment, a pressure is applied from the distal end 38A of the projection 38 of the second punch 36.to portions of the plates 16, 18 located within the cylindrical portion 14. With the pressure thus applied, the opening angle formed by deformation of the distal end portion 14A of the cylindrical portion 14 can be increased owing to the projection 24 formed on the bottom 22 of the cylindrical portion 14. Consequently, the fastening strength is further enhanced.

Figure 8A:
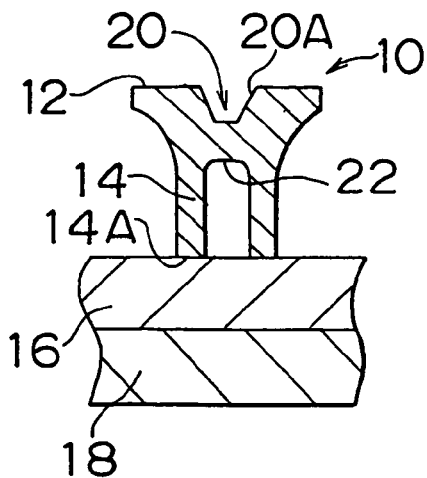
FIG. 8A is a side cross-sectional view showing a rivet as a modified example of the first embodiment before the rivet is driven into a workpiece.
Figure 8B:
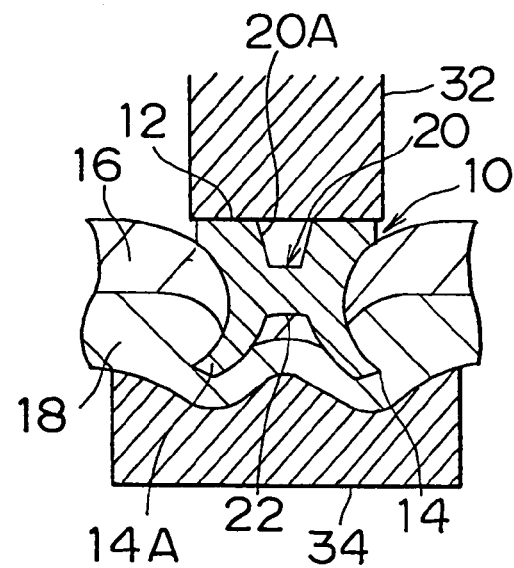
FIG. 8B is a side cross-sectional view showing the rivet of the modified example when it is being driven into the workpiece.
Figure 8C:
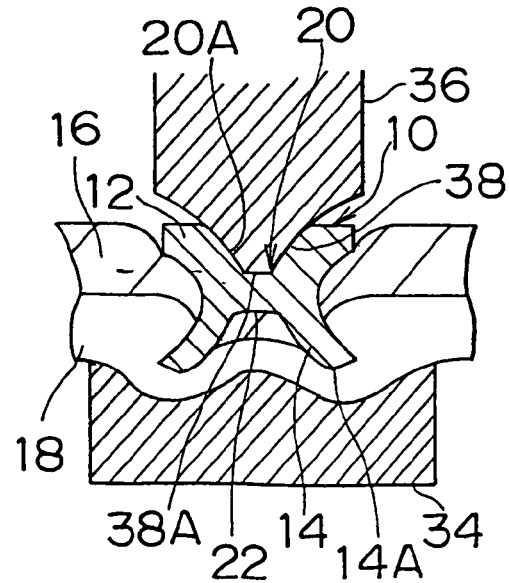
FIG. 8C is a side cross-sectional view showing the rivet of the modified example after it is driven into the workpiece.

While the conical projection 24 is formed on the bottom 22 of the cylindrical portion 14 of the rivet 10 in the present embodiment, the riveting method of the present invention may be applied to a rivet according to a modification of this embodiment having no projection on the bottom 22 of the cylindrical portion 14 of the rivet 10 as shown in FIGS. 8A, 8B and 8C.

Figure 9A:
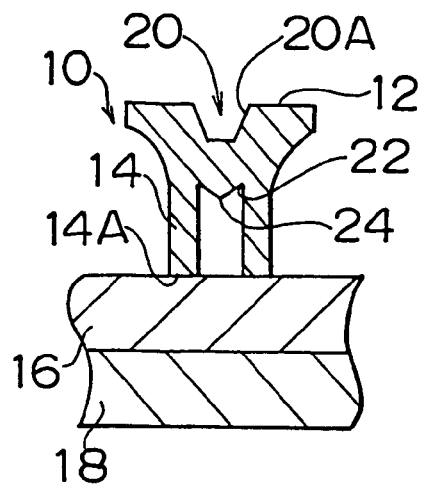
FIG. 9A is a side cross-sectional view showing a rivet according to the second embodiment of the first and second aspects of the present invention before the rivet is driven into a workpiece.

Next, a second embodiment of the first and second aspects of the present invention will be described with reference to FIGS. 9A to 9C. In these figures, the same reference numerals as used in FIGS. 6A to 6C showing the first embodiment are used for identifying corresponding elements, of which no detailed description will be provided.

Figure 9B:
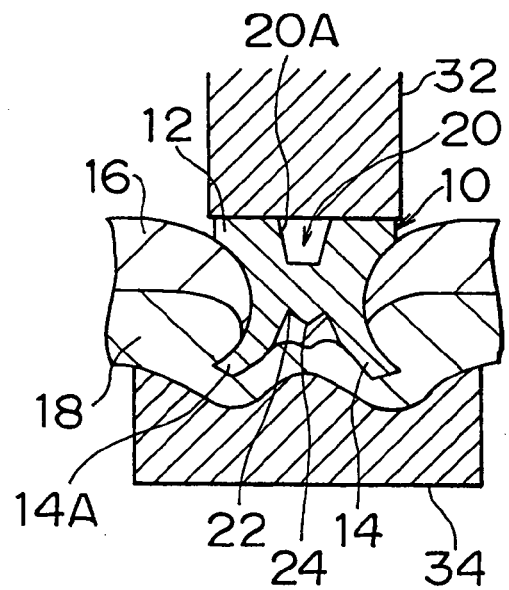
FIG. 9B is a side cross-sectional view showing the rivet of the second embodiment when it is being driven into the workpiece.
Figure 9C:
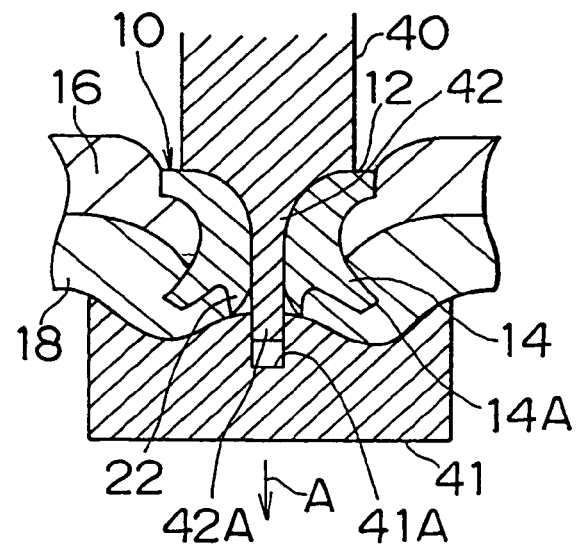
FIG. 9C is a side cross-sectional view showing the rivet of the second embodiment after it is driven into the workpiece.

In the present embodiment as shown in FIG. 9C, the bottom wall 20B of the recess 20 of the head portion 12 of the rivet 10 is punched out.

Next, the riveting method of the present embodiment will be explained. Initially, as shown in FIG. 9A, the distal end 14A of the cylindrical portion 14 of the rivet 10 is positioned on one (16) of two plates 16, 18 to be fastened.

Next, as shown in FIG. 9B, the head portion 12 of the rivet 10 is pressed or driven by a first punch 32 so that a die 34 disposed on the side of the plate 18 causes the distal end portion 14A of the cylindrical portion 14 of the rivet 10 to deform radially outwards.

Next, as shown in FIG. 9C, the head-12 of the rivet 10 is punched by a second punch 40 and a die 41. The second punch 40 is formed at its distal end portion with an elongate protrusion 42 having a generally truncated conical shape, and the opening angle θ of the protrusion 42 is set greater than the opening angle θ2 of the recess 20 of the rivet 10 (θ1>θ2). Further, a distal end portion 42A of the protrusion 42 in the form of a rod extends from the main body of the second punch 40, while a die 41 is formed with a recess 41A into which the distal end portion of the protrusion 42 can be inserted.

In the manner as described above, the outer circumferential wall 20A of the recess 20 formed in the head portion 12 of the rivet 10 is pressed by the protrusion 42, thereby to expand radially outwards. Also, the distal end portion 42A of the protrusion 42 applies a pressure onto the bottom wall 20B of the recess 20 in an axial direction of the cylindrical portion 14 (direction of arrow A in FIG. 9C) so as to expand the cylindrical portion 14 radially outwards, while at the same time punching out the bottom wall 20B of the recess 20.

The effects of the present embodiment will be now explained. In the present embodiment, after the rivet 10 is driven into the plates 16, 18, the protrusion 42 of the second punch 36 is pressed against the wall of the recess 20 formed in the head portion 12 of the rivet 10, so that the outer circumferential wall 20A of the recess 20 expands outwards. As a result, any clearance or gap between the head portion 12 of the rivet 10 and the plate 16 can be eliminated, thus assuring an increased strength with which the plates 16, 18 are joined or fastened together.

Also in the present embodiment, a pressure is transmitted from the distal end 42A of the protrusion 42 of the second punch 36 to portions of the plates 16, 18 located within the cylindrical portion 14. With the pressure thus applied, the opening angle formed by the distal end portion 14A of the cylindrical portion 14 after deformation thereof can be increased. Moreover, the bottom wall 20A of the recess 20 is punched out by the distal end portion 42A of the protrusion 42, whereby the cylindrical portion 14 expands further radially outwards. Consequently, the fastening strength is further enhanced.

Figure 10:
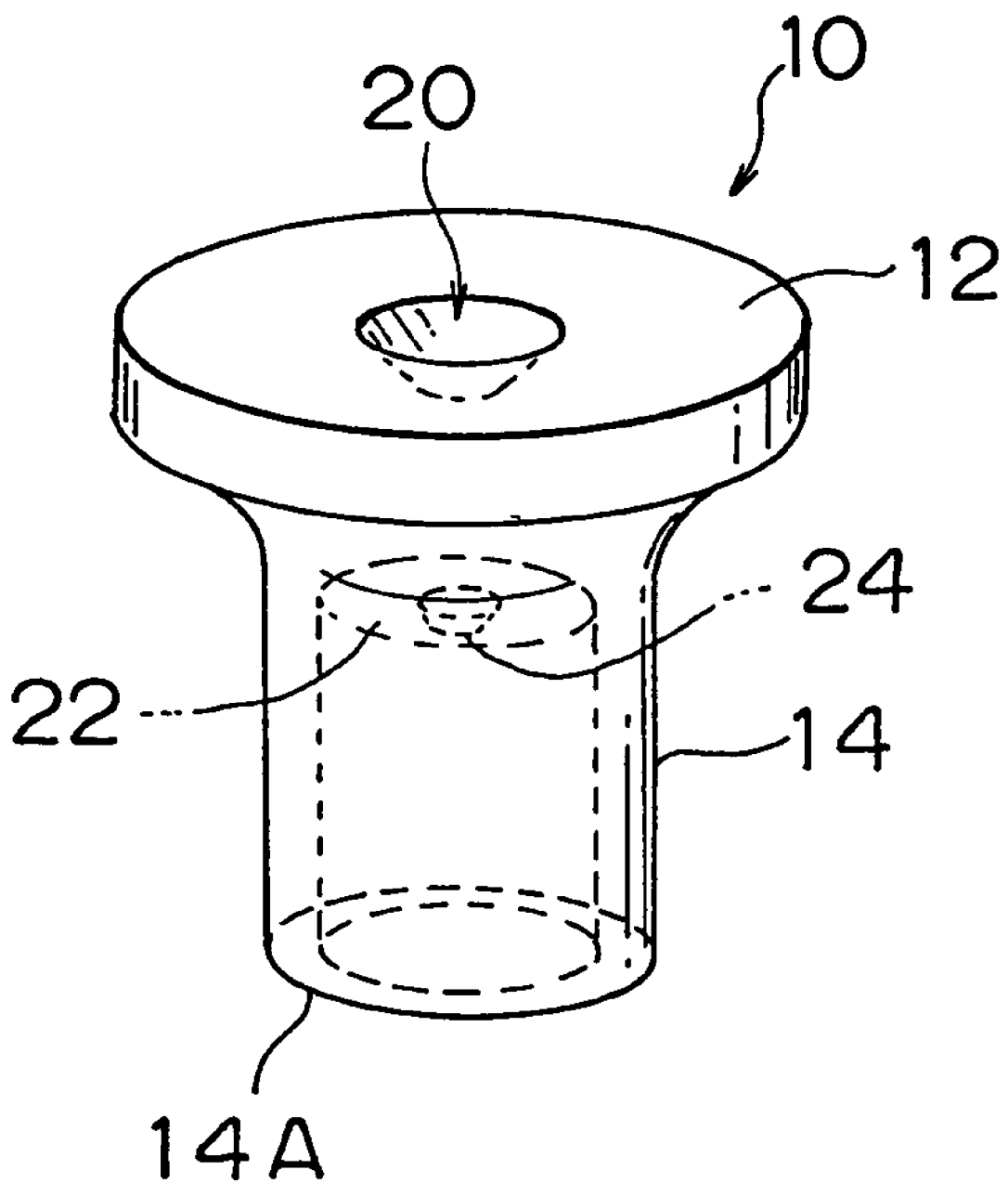
FIG. 10 is a perspective view showing a rivet according to a modification of the first embodiment of the present invention.

While some embodiments of the present invention have been described in detail, for illustrative purpose only, the present invention is not limited to details of these embodiments, but may be embodied with various changes, modifications and/or improvements, without departing from the scope of the present invention. In the illustrated embodiments, after the rivet 10 is driven into the plates 16, 18 by means of the first punch 32, the second punch 36 or 40 is used for applying a pressure to the walls of the recess 20 formed in the head portion 12 of the rivet 10. This riveting method may be replaced by another method in which a pressure is applied to the walls of the recess at the same time that the rivet 10 is driven into the plates 16, 18. While the recess 20 has an inverted, truncated conical shape, and the projection 24 has a conical shape in the illustrated embodiments, the shapes of the recess 20 and projection 24 are not limited to these, but may be changed. For example, the recess 20 and projection 24 may have other shapes, such as a semi-spherical shape as shown in FIG. 10, or a columnar shape (not shown). The riveted joint structure and the riveting method according to the present invention may also be employed in the case where three or more plates are fastened or joined together.

Next, a riveted joint structure according to the third embodiment of the present invention will be explained with reference to FIGS. 11A, 11B and 12.

Figure 11A:
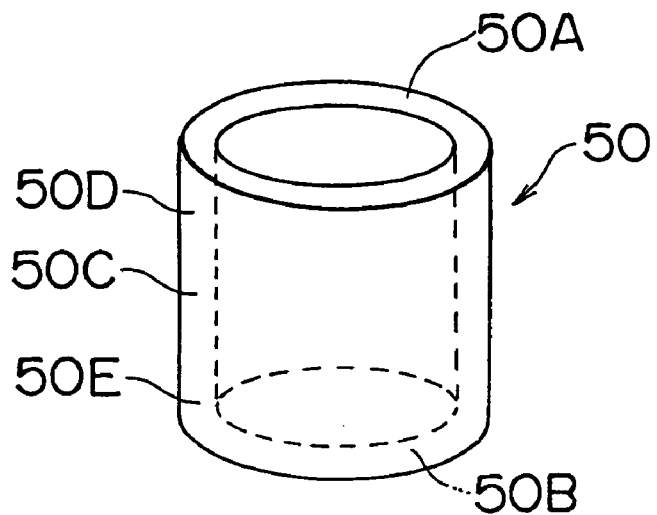
FIG. 11A is a perspective view showing a rivet body of a riveted joint structure according to the third embodiment of the first and second aspects of the present invention.

As shown in FIG. 11A, a rivet of the present embodiment is a self-piercing tube-like rivet. A rivet body 50 as a whole assumes a cylindrical or tubular shape.

Figure 11B:
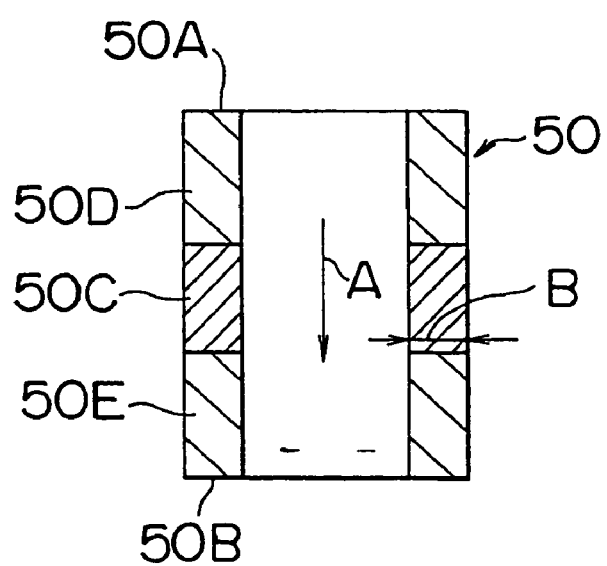
FIG. 11B is a side cross-sectional view showing the rivet body in the riveted joint structure of the third embodiment.

As shown in FIG. 11B, axially opposite ends 50A and 50B of the rivet body 50 have flat surfaces perpendicular to the direction in which the rivet is driven into a workpiece (direction of arrow A in FIG. 11B). In an axially middle portion of the rivet body 50, a plastic deformation restricting portion 50C is formed over the entire thickness of the rivet body 50 (in the direction of arrow B in FIG. 11B). More specifically, the rivet body 50 is made of a metal, such as iron, that may be subjected to heat treatment, and the plastic deformation restricting portion 50C is formed by heat treatment, such as thermal quenching or high frequency quenching, so as to be less likely to undergo plastic deformation as compared with opposite end portions 50D and 50E as viewed in the rivet driving direction. That is, in the rivet body 50, the plastic deformation restricting portion 50C located at an axially middle portion of the rivet body 50 is less likely to be deformed as compared with the opposite end portions 50D and 50E as viewed in the rivet driving direction.

Next, the effects of the present embodiment will be explained. In the present embodiment, the plastic deformation restricting portion 50C provided at the axially middle portion of the rivet body 50 is less likely to be deformed when the rivet is inserted into a workpiece, thus assuring an improved efficiency or ease with which the rivet is driven into the workpiece. Also, the opposite end portions 50D and 50E of the rivet body 50 as viewed in the rivet driving direction are more likely to be deformed upon insertion of the rivet, and is thus surely squashed or flattened. Thus, the rivet body 50 can achieve both a required rivet-driving efficiency and desired deformation characteristics, thus assuring a sufficiently large fastening strength. Also, in the present embodiment, the plastic deformation restricting portion 50C can be easily formed by the heat treatment.

Figure 12:
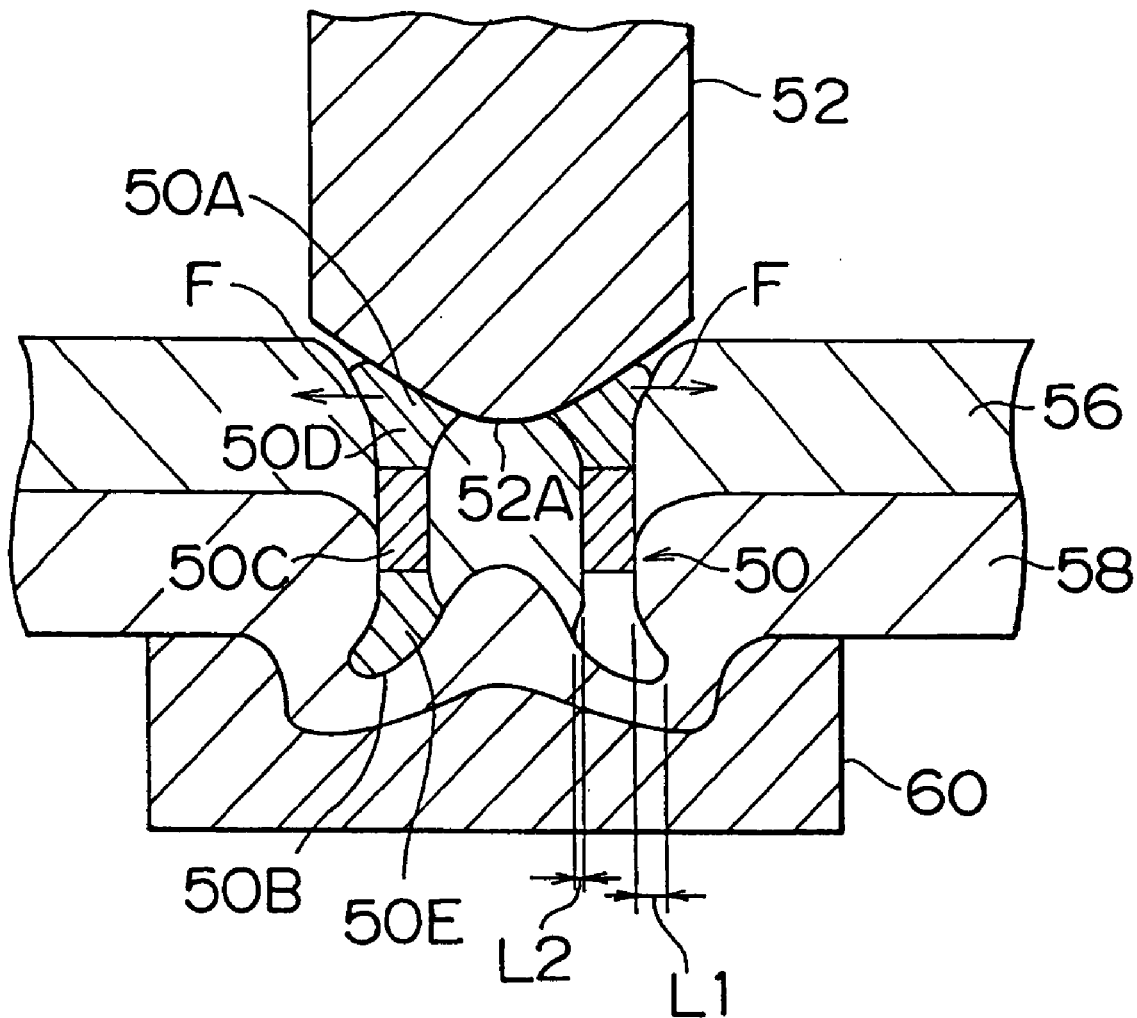
FIG. 12 is a side cross-sectional view showing the riveted joint structure of the third embodiment when the rivet is being driven into a workpiece.

As shown in FIG. 12, in the present embodiment, the rivet body 50 is driven into two plates 56, 58 as a workpiece to be fastened, by means of a punch 12 having a semi-spherical or convex distal end portion 52A. As a result, one of opposite end portions 50E of the rivet body 50 is easily deformed by a die 60 supporting the plates 56, 58, so as to expand radially outwardly (lapping margin L1) and inwardly (lapping margin L2) of the rivet body 50. At the same time, the other end portion 50D of the rivet body 50 against which the distal end portion 52A of the punch 52 is pressed is also effectively deformed in the direction of the plane of the plate 56, due to a part of a load (indicated by arrow F in FIG. 12)

that is applied when the rivet body 50 is driven into the workpiece. Consequently, the fastening force can be further enhanced.

While the rivet body 50 as a whole assumes a cylindrical shape in the present embodiment, the rivet body 50 is not limited to this, but may be constructed otherwise. For example, the rivet body 50 may be a solid, rod-like or columnar member, or may be formed with a head portion having a larger diameter than that of its cylindrical or rod-like portion.

Figure 13A:
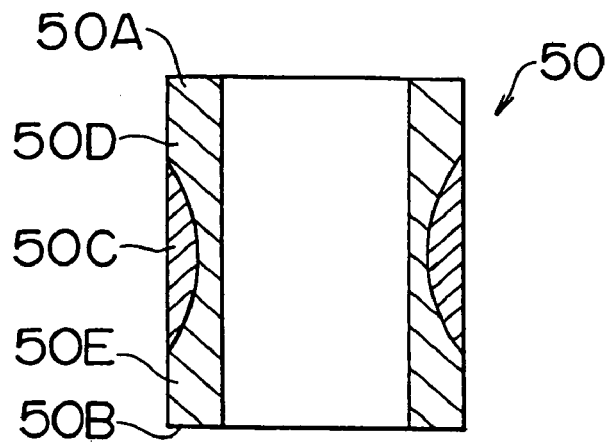
FIG. 13A is a side cross-sectional view showing a rivet body in a riveted joint structure according to a modified example of the third embodiment.
Figure 13B:
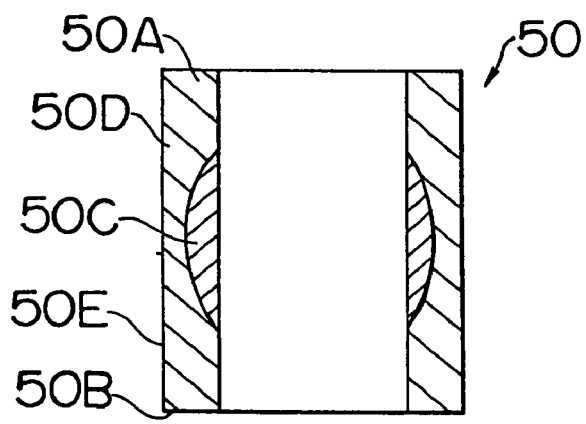
FIG. 13B is a side cross-sectional view showing a rivet body in a riveted joint structure according to another modified example of the third embodiment.
Figure 13C:
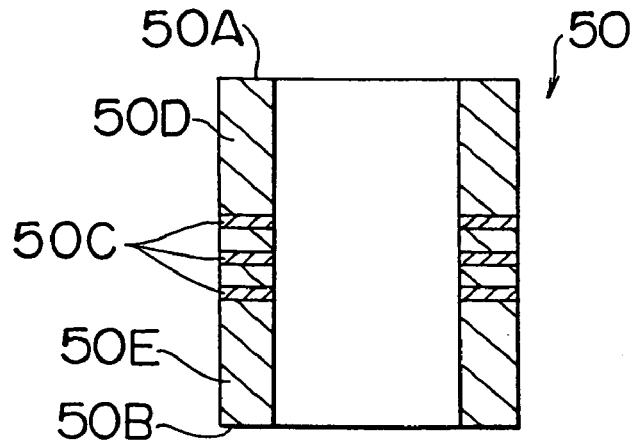
FIG. 13C is a side cross-sectional view showing a rivet body in a riveted joint structure according to a further modified example of the third embodiment.

While the plastic deformation restricting portion 50C is formed over the entire thickness of the axially middle portion of the rivet body 50 in the present embodiment, the plastic deformation restricting portion 50C may be formed only in an outer peripheral portion or radially outer portion of the axially middle portion of the rivet body 50, as shown in FIG. 13A, or the plastic deformation restricting portion 50C may be formed only in an inner peripheral portion or radially inner portion of the axially middle portion of the rivet body 50, as shown in FIG. 13B. Alternatively, a plurality of plastic deformation restricting portions 50C may be formed at certain intervals as viewed in the axial direction of the rivet body 50.

Although the plastic deformation restricting portion 50C is formed by heat treatment so that it becomes less likely to plastically deform in the present embodiment, it is also possible to form the plastic deformation restricting portion 50C that is unlikely to plastically deform, by adjusting the content of carbon, nitrogen or the like (carbonizing, nitriding, or the like).

Figure 14:
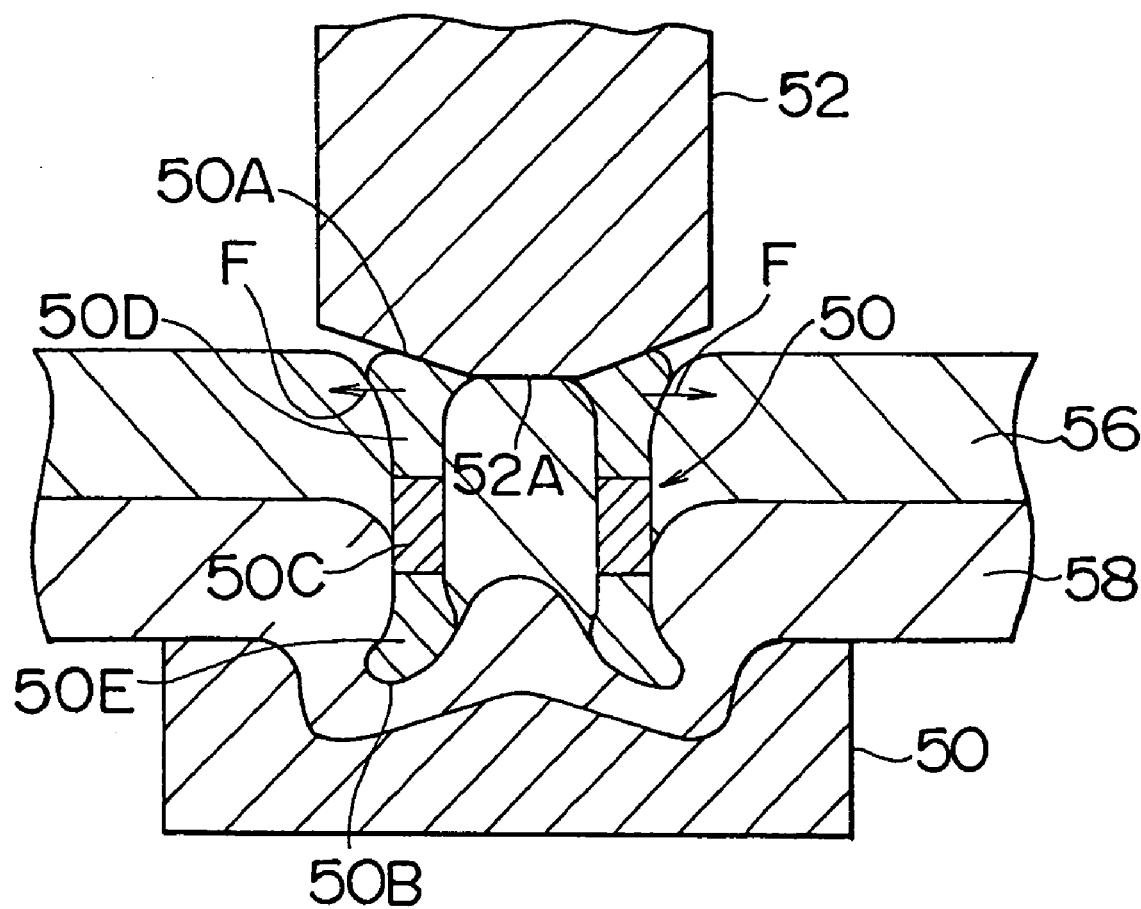
FIG. 14 is a side cross-sectional view showing a riveted joint structure according to a modified example of the third embodiment in which a rivet is being driven into a workpiece.

While the distal end portion 52A of the punch 52 assumes a semi-spherical convex shape in the present embodiment, the distal end portion 52A is not limited to this shape, but may be formed into another convex shape, such as a truncated conical shape as shown in FIG. 14.

Next, a riveted joint structure according to the fourth embodiment of the present invention will be explained with reference to FIGS. 15A to 15D.

Figure 15A:
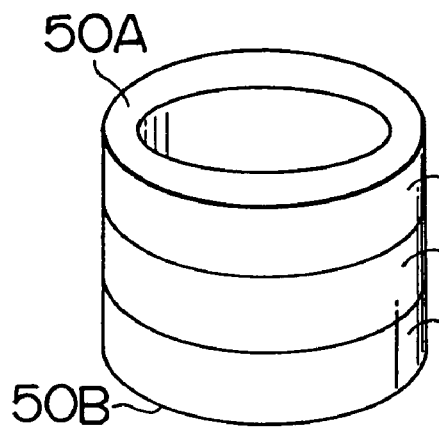
FIG. 15A is a perspective view showing a rivet body of a riveted joint structure according to the fourth embodiment of the first and second aspects of the present invention.

In FIGS. 15A to 15D, the same reference numerals as used in FIG. 12 with respect to the third embodiment are used for identifying corresponding elements, of which no detailed description will be provided. As shown in FIG. 15A, the rivet 50 of the present embodiment is made of a light alloy of aluminum, magnesium, or the like. A ring-like plastic deformation restricting portion 50C is formed in an outer peripheral portion (or radially outer portion) of the axially middle portion of the rivet body 50.

Figure 15B:
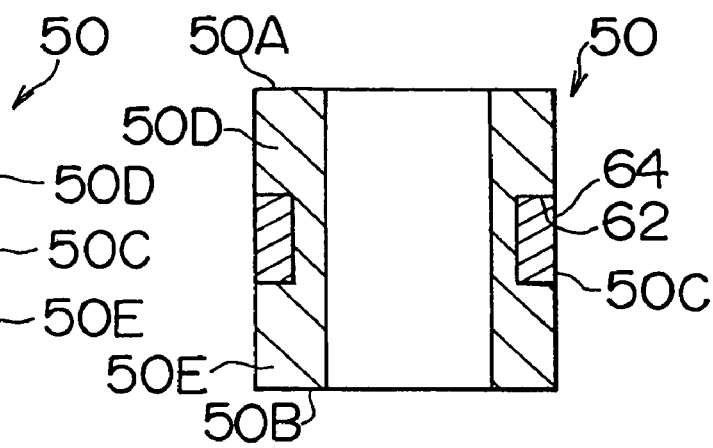
FIG. 15B is a side cross-sectional view showing the rivet body in the riveted joint structure of the fourth embodiment.
Figure 15C:
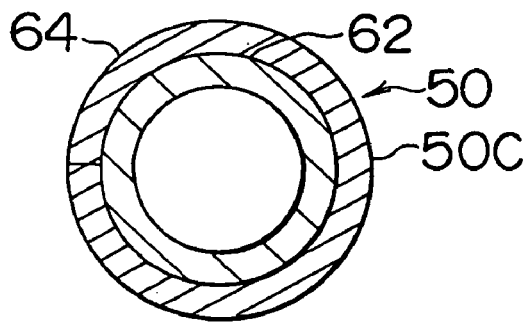
FIG. 15C is a cross-sectional view showing an axially middle portion of the rivet body in the riveted joint structure according to the fourth embodiment.
Figure 15D:
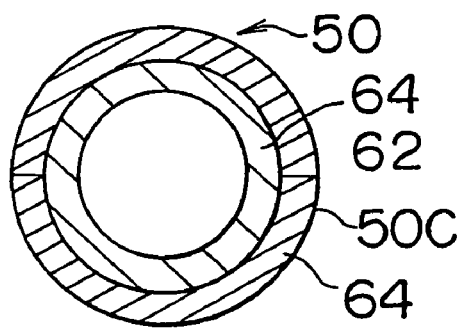
FIG. 15D is a cross-sectional view showing an axially middle portion of a rivet body in a riveted joint structure as a modified example of the fourth embodiment.

More specifically, an annular groove 62 is formed in an outer peripheral portion of the axially middle portion of the rivet body 50, as shown in FIG. 15B. A metal ring 64 formed of another light alloy or iron, which has a higher strength (in terms of Young's modulus, yield stress, or hardness) and less likely to plastically deform than the light alloy forming the rivet body 50, is disposed in the groove 62. As shown in FIG. 15C, the metal ring 64 has a C-shaped cross section, and is wound around the rivet body 50 to fit in the groove 62.

As in the third embodiment, the rivet body 50 constructed according to the present embodiment can satisfy both a required rivet-driving efficiency with which the rivet is driven into a workpiece, and desired deformation characteristics, thus assuring a sufficiently large fastening strength. Also, since the material of the plastic deformation restricting portion 50C can be selected as desired, it is possible to finely adjust the rivet-driving efficiency and deformation characteristics of the rivet body 50, by suitably selecting the material of the plastic deformation restricting portion 50C.

While the metal ring 64 is formed into C-shape in cross section and received in the annular groove 62 as shown in FIG. 15C in the present embodiment, the metal ring 64 may be cut into two pieces, each having a semi-circular shape in cross section, and these two pieces may be fitted into the annular groove 62.

Figure 16A:
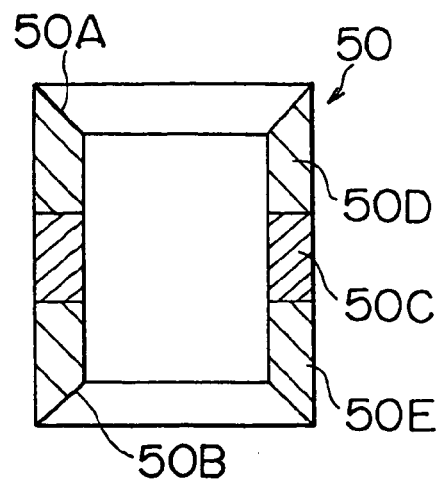
FIG. 16A is a side cross-sectional view showing a rivet body in a riveted joint structure according to another embodiment of the present invention.
Figure 16B:
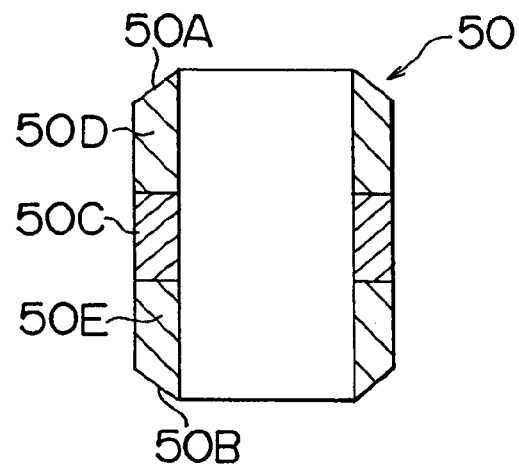
FIG. 16B is a side cross-sectional view showing a rivet body in a riveted joint structure according to a further embodiment of the present invention.
Figure 16C:
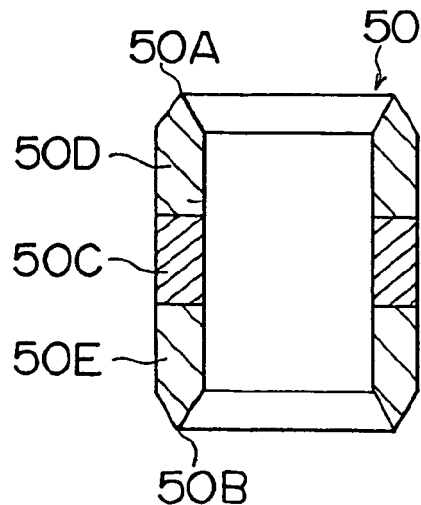
FIG. 16C is a side cross-sectional view showing a rivet body in a riveted joint structure according to a still further embodiment of the present invention.

In the third and fourth embodiments, the axially opposite end portions 50A and 50B of the rivet body 50 have flat surfaces perpendicular to the direction in which the rivet is driven into a workpiece. Instead, axially opposite end portions 50A and 50B of the rivet body 50 may be tapered radially inwards such that each axial end face and the outer circumferential surface form an acute angle therebetween, to provide a sharp edge at the outer periphery, as shown in FIG. 16A. Also, as shown in FIG. 16B, the axially opposite end portions 50A and 50B of the rivet body 50 may be tapered outwards such that each axial end face and the inner circumferential surface of the rivet body 50 form an acute angle therebetween, to provide a sharp edge at the inner periphery. It is also possible to form the axially opposite end portions 50A, 50B of the rivet body 50 into an angular shape pointed in the rivet-driving direction, as shown in FIG. 16C.

Next, a riveting apparatus according to the first embodiment of the third aspect of the present invention will be explained with reference to FIGS. 17A and 17B.

Figure 17A:
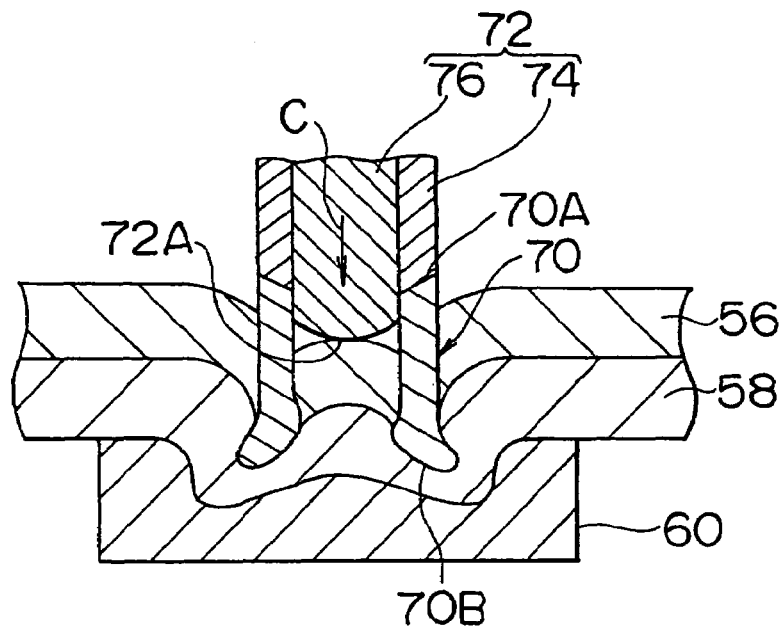
FIG. 17A is a side cross-sectional view showing the initial state of an operation to drive or insert a rivet into a workpiece, using a riveting apparatus according to the first embodiment of the third aspect of the present invention.
Figure 17B:
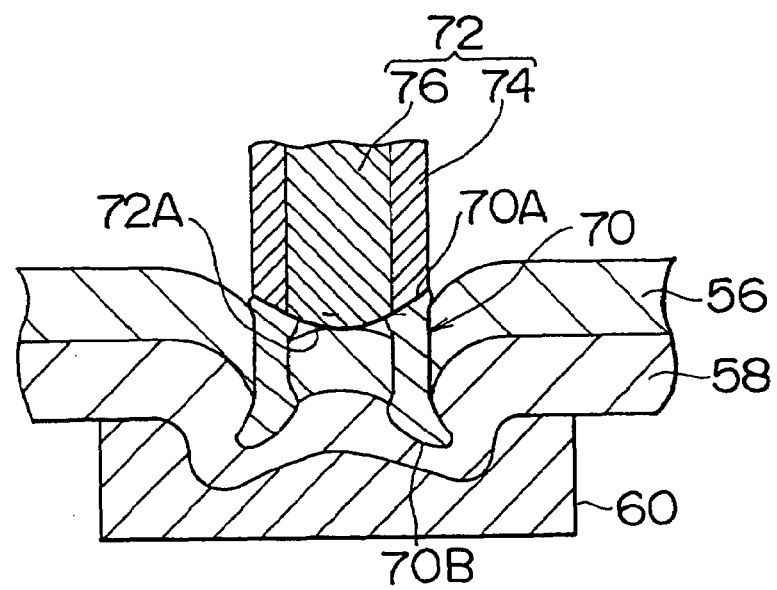
FIG. 17B is a side cross-sectional view showing the state in which the rivet inserting operation using the riveting apparatus of the first embodiment has been completed.

As shown in FIG. 17A, in the present embodiment, a rivet body 70 as a whole is formed into a cylindrical shape. A punch 72 for driving the rivet body 70 into a workpiece 56, 58 includes a cylindrical, load transmitting portion 74 for transmitting a driving load to the rivet body 70, and a columnar guide portion 76 disposed inside of the load transmitting portion 74 for holding the rivet body 70. A distal end portion 72A of the punch 72 as a whole is formed into a semi-spherical convex shape. When the rivet body 70 is driven or inserted into the workpiece, the load transmitting portion 74 can move relative to the guide portion 76 in the rivet-driving direction (i.e., the direction of arrow C in FIG. 17A) and the opposite direction. More specifically, during insertion of the rivet body 70, the moving speed of the guide portion 76 relative to the load transmitting portion 74 is reduced after a distal end 70B (leading end in the rivet-driving direction) of the rivet body 70 reaches the plate 56.

Next, the effects of the present embodiment will be explained. In the present embodiment, the load transmitting portion 74 and the guide portion 76 of the punch 72 are positioned relative to each other such that the load transmitting portion 74 is retracted a certain distance from the guide portion 76 until the rivet body 70 abuts on the plate 56, and the rivet body 70 can be held on the outer periphery of the guide portion 76. After the rivet body 70 is driven into the plate 56, the moving speed of the guide portion 76 relative to the load transmitting portion 74 is reduced, and therefore the guide portion 76 moves relative to the load transmitting portion 74 in the direction opposite to the rivet-driving direction (direction of arrow C in FIG. 17A). Thus, the load-transmitting portion 74 and the guide portion 76 of the punch 72 are positioned so as not to interfere with radially inward deformation of an end portion 70A (on the side of the punch) of the rivet body 70.

With the above arrangement, the guide portion 76 is able to prevent deformation of the axially middle portion of the rivet body 70 during insertion of the rivet body 70, as shown in FIG. 17A, thus assuring improved efficiency and ease with which the rivet body 70 can be driven into the workpiece. Further, as shown in FIG. 17B, the opposite end portions 70A, 70B of the rivet body 70 are surely deformed upon completion of the insertion of the rivet body 70, thus assuring desired deformation characteristics and a sufficiently large fastening force.

In the present embodiment, after the distal end 70B (the leading end in the rivet-driving direction) of the rivet body 70 reaches the plate 56, the moving speed of the guide portion 76 relative to the load transmitting portion 74 is reduced. Rather, the moving speed of the guide portion 76 relative to the load transmitting portion 74 may be increased after the leading end 70B of the rivet body 70 reaches the plate 56. In this case, the rivet body 70 can be held or supported on the outer periphery of the guide portion 76 until the rivet body 70 abuts on the plate 56. Also, since the moving speed of the guide portion 76 relative to the load transmitting portion 74 is increased after the rivet body 70 is driven into the plate 56, the guide portion 76 moves in the rivet-driving direction (direction of arrow C in FIG. 17A) relative to the load transmitting portion 74, to apply a pressure to the plates 56 and 58 located inside the rivet body 70, whereby the leading end portion 70B of the rivet body 70 can be largely deformed radially outwards. Thus, the rivet body 70 can be driven into the workpiece with improved efficiency and ease, while assuring desired deformation characteristics and a sufficiently large fastening force.

Figure 18A:
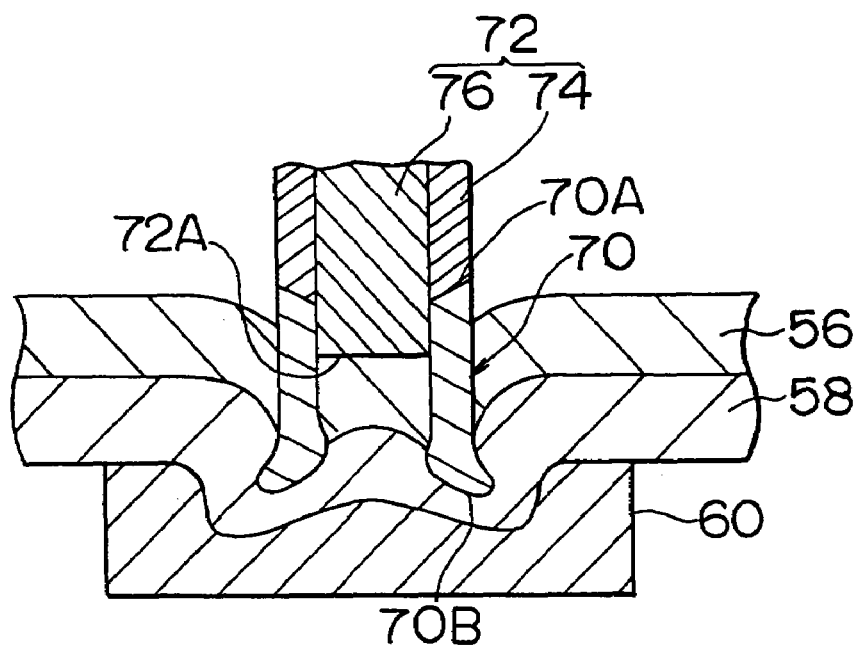
FIG. 18A is a side cross-sectional view showing the initial state of an operation to drive or insert a rivet into a workpiece, using a riveting apparatus as a modified example of the first embodiment of the third aspect of the present invention.
Figure 18B:
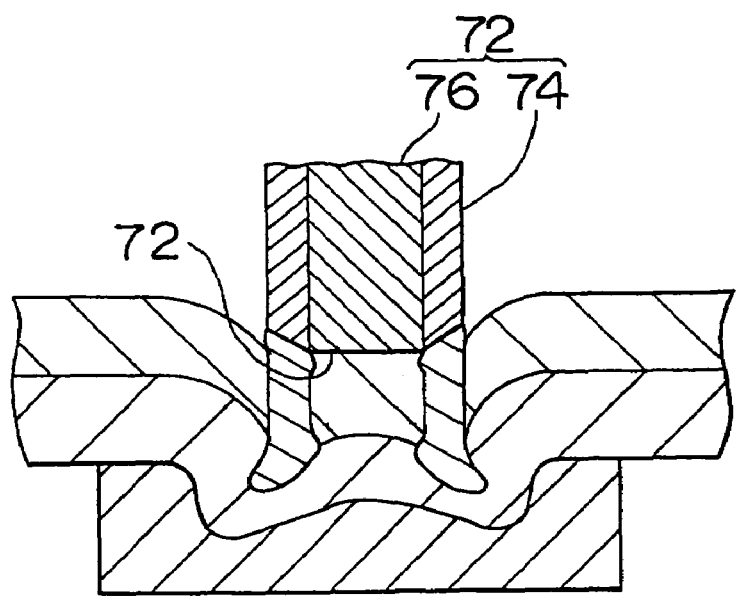
FIG. 18B is a side cross-sectional view showing the state in which the rivet inserting operation using the riveting apparatus of the modified example of the first embodiment has been completed.

While the distal end portion 72A of the punch 72 as a whole has a semi-spherical convex shape in the present embodiment, the shape of the end portion 72A of the punch 72 is not limited to this, but another shape, such as a truncated conical shape as shown in FIGS. 18A and 18B, may be employed.

Next, a riveting apparatus according to the second embodiment of the third aspect of the present invention will be explained with reference to FIGS. 19A and 19B.

Figure 19A:
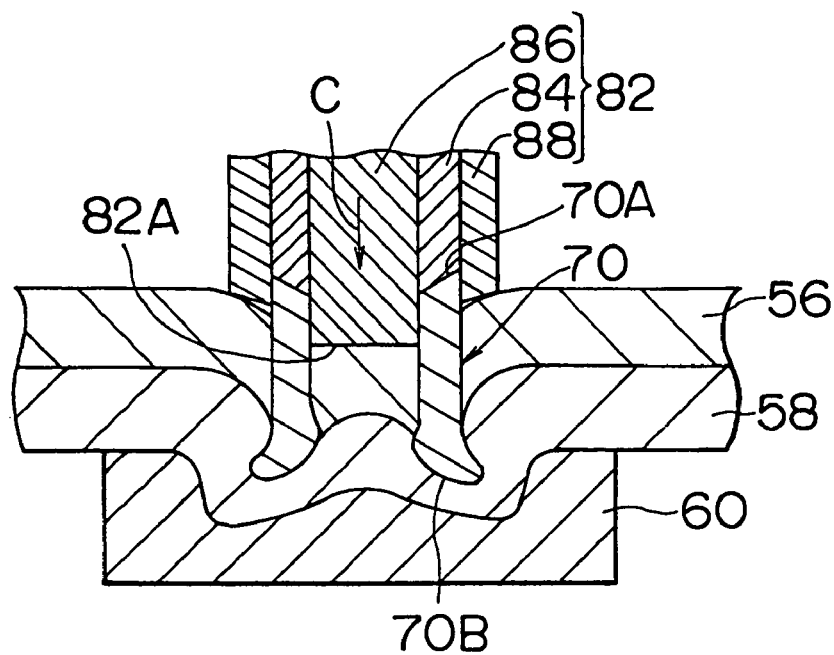
FIG. 19A is a side cross-sectional view showing the initial state of an operation to drive or insert a rivet into a workpiece, using a riveting apparatus according to the second embodiment of the third aspect of the present invention.
Figure 19B:
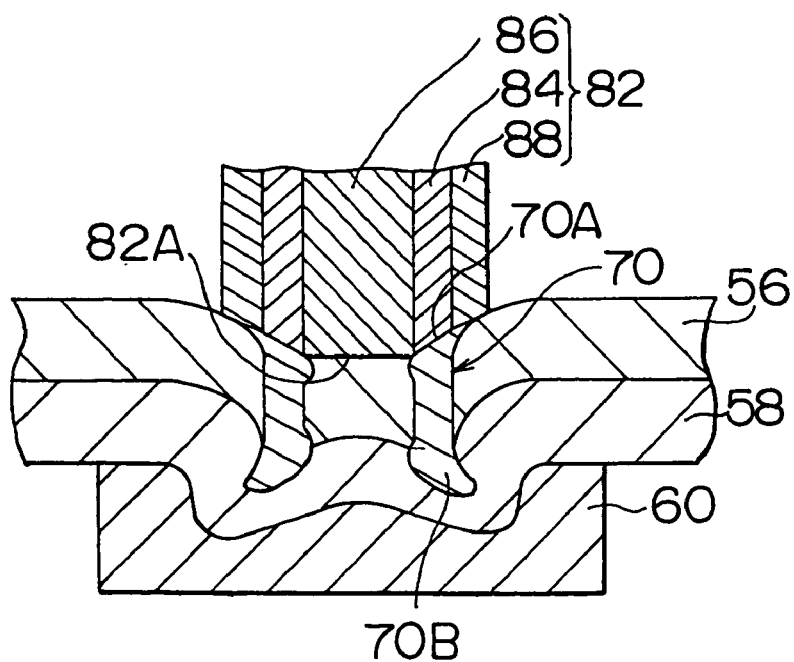
FIG. 19B is a side cross-sectional view showing the state in which the rivet inserting operation using the riveting apparatus of the second embodiment has been completed.

As shown in FIG. 19A, in the present embodiment, a rivet body 70 as a whole is formed into a cylindrical shape. A punch 82 for driving the rivet body 70 into a workpiece (56, 58) includes a cylindrical, load transmitting portion 84 for transmitting a driving load to the rivet body 70, and an inner guide portion 86 and an outer guide portion 88 respectively disposed inside and outside of the load transmitting portion 84 for holding the rivet body 70 before it is driven into the workpiece. The inner guide portion 86 has a columnar or rod-like shape, and the outer guide portion 88 has a cylindrical shape. A distal end portion 82A of the punch 82 as a whole has a convex shape. Upon insertion of the rivet body 70 into the workpiece, the load transmitting portion 84 can move in the rivet-driving direction (direction of arrow C in FIG. 19A) relative to the inner guide portion 86 and the outer guide portion 88. More specifically, when the rivet body 70 is driven into the workpiece, the load transmitting portion 84 is retracted from the inner guide portion 86 and the outer guide portion 88 (as shown in FIG. 19A), and the rivet body 70 is sandwiched between the inner guide portion 86 and the outer guide portion 88. At this time, only the load transmitting portion 84 functions to drive the rivet body 70 into the workpiece.

When the inner guide portion 86 and the outer guide portion 88 reach the upper plate 56; the load transmitting portion 84 moves relative to the inner guide portion 86 and the outer guide portion 88 in the rivet-driving direction (direction of arrow C in FIG. 19A), to deform the upper end 70A of the rivet body 70 radially outwards and inwards. The load transmitting portion 84 then stops at a position (as shown in FIG. 19B) at which the end faces of the load transmitting portion 84, the inner guide portion 86 and the outer guide portion 88 are aligned or made continuous with each other.

Next, the operation of the present embodiment will be explained. In the present embodiment, the load transmitting portion 84, the inner guide portion 86 and the outer guide portion 88 of the punch 82 are positioned relative to one another such that the rivet body 70 can be held or supported between the inner guide portion 86 and the outer guide portion 88 until the inner guide portion 86 and the outer guide portion 88 reach the upper plate 56. Once the inner guide portion 86 and the outer guide portion 88 reach the upper plate 56, the load transmitting portion 84 moves in the rivet-driving direction relative to the inner guide portion 86 and the outer guide portion 88, thereby to deform the upper end 70A of the rivet body 70 radially outwards and inwards. The load transmitting portion 84 then stops at a position (as shown in FIG. 19B) at which the end faces of the load transmitting-portion 84, the inner guide portion 86 and the outer guide portion 88 are aligned or made continuous with each other.

With the above arrangement, the inner and outer guide portions 86, 88 are able to prevent deformation of the axially middle portion of the rivet body 70 during insertion of the rivet body 70, as shown in FIG. 19A, thus assuring improved efficiency and ease with which the rivet body 70 can be driven into the workpiece. Further, as shown in FIG. 19B, the opposite end portions 70A, 70B of the rivet body 70 are surely deformed upon completion of the insertion of the rivet body 70, thus assuring desired deformation characteristics and a sufficiently large fastening force.

Although the distal end portion 82A of the punch 82 as a whole is formed into a convex, truncated conical shape in the present embodiment, the shape of the distal end portion 82A of the punch 82 is not limited to this, but other convex shape, such as a truncated semi-spherical shape, may be employed.

A riveting apparatus according to the third embodiment of the third aspect of the present invention will be explained with reference to FIGS. 20A and 20B.

Figure 20A:
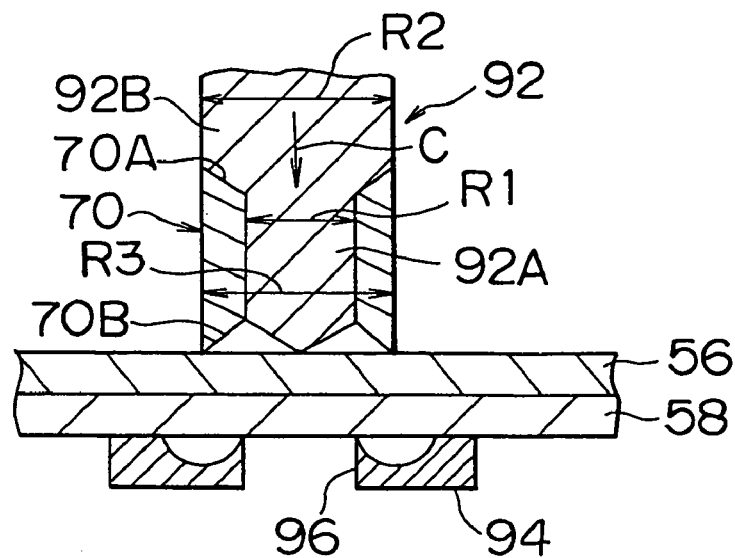
FIG. 20A is a side cross-sectional view showing the initial state of an operation to drive or insert a rivet into a workpiece, using a riveting apparatus according to the third embodiment of the third aspect of the present invention, in a riveting method according to the first embodiment of the fourth aspect of the invention.
Figure 20B:
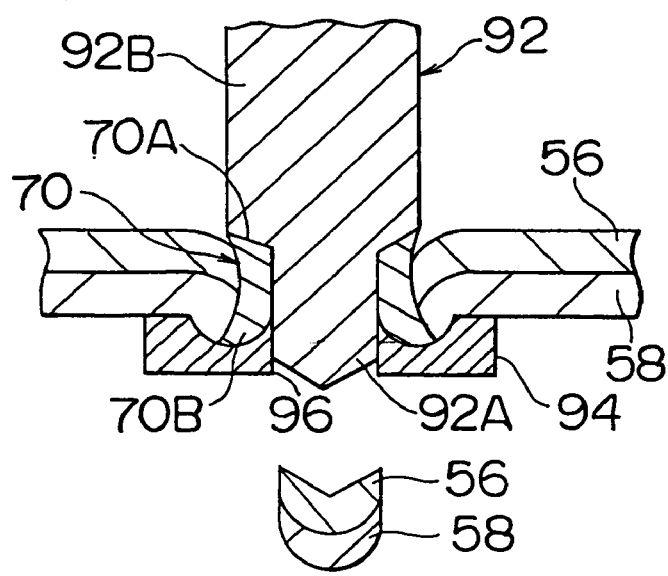
FIG. 20B is a side cross-sectional view showing the state in which the rivet inserting operation using the riveting apparatus and riveting method of FIG. 20A has been completed.

As shown in FIG. 20A, in the present embodiment, the rivet body 70 as a whole has a cylindrical shape, and a punch 92 for driving the rivet body 70 into a workpiece (56, 58) is of a passing-through type. A distal end portion of the punch 92 provides a guide portion 92A for holding or supporting the rivet body 70. The guide portion 92A has a diameter R1 that is smaller than the diameter R2 of a load transmitting portion (main body) 92B (R1<R2). The diameter R2 of the load transmitting portion 92B is substantially equal to the outside diameter R3 of the rivet body 70 (R2=R3), and the diameter R1 of the guide portion 92A is determined such that the guide portion 92A can be fitted in the inner periphery of the rivet body 70 so as to support the rivet body 70.

On the other hand, a die 94 for supporting the plates 56 and 58 is formed with a punching hole 96 that is opposed to the guide portion 92A of the punch 92. With this arrangement, the rivet body 70 can be driven into the workpiece, and portions of the plates 16, 18 located inside the cylindrical rivet body 70 are punched out, only by movement of the punch 92 in the rivet-driving direction (direction of arrow C in FIG. 20A), namely, by one reciprocating movement of the punch 92. Next, a riveting method using the riveting apparatus of the present embodiment will be explained. In the present embodiment, as shown in FIGS. 20A and 20B, a step of driving the rivet body 70 into the plates 56 and 58 by the punch 92, a step of deforming the axially opposite end portions 70A and 70B of the rivet body 70, and a step of punching out portions of the plates 56 and 58 located within the cylindrical rivet body 70 are carried out by one reciprocating movement of the punch 92 in the rivet-driving direction (direction of arrow C in FIG. 20A).

The effects of the present embodiment will be explained. In the present embodiment, since the rivet body 70 is supported at its inner peripheral portion by the guide portion 92A of the punch 92, the rivet body 70 can be driven into the plates 56, 58 while the axially middle portion of the rivet body 70 is unlikely to be deformed. Further, as shown in FIG. 20B, the opposite ends 70A and 70B of the rivet body 70 can be effectively deformed by the punch 92 and the die 94 formed with the punching hole 96. Thus, the rivet body 70 can be driven into the workpiece with improved efficiency and ease, while assuring desired deformation characteristics and sufficiently large fastening force.

Furthermore, in the present embodiment, joining the plates 56 and 58 together by the rivet body 70 and punching-out of the plates 56, 58 located inside the rivet body 70 can be accomplished in one step, thus assuring an improved efficiency.

A riveting apparatus according to the fourth embodiment of the present invention will be explained with reference to FIGS. 21A and 21B.

Figure 21A:
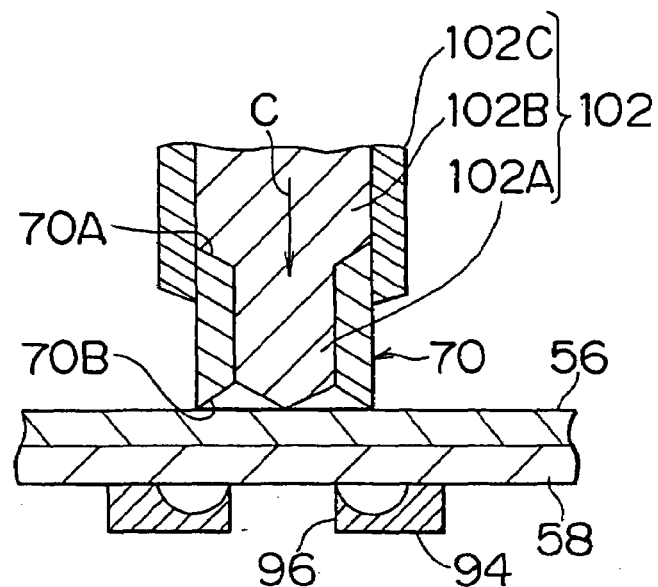
FIG. 21A is a side cross-sectional view showing the initial state of an operation to drive or insert a rivet into a workpiece, using a riveting apparatus according to the fourth embodiment of the third aspect of the present invention, in a riveting method according to the second embodiment of the fourth aspect of the invention.
Figure 21B:
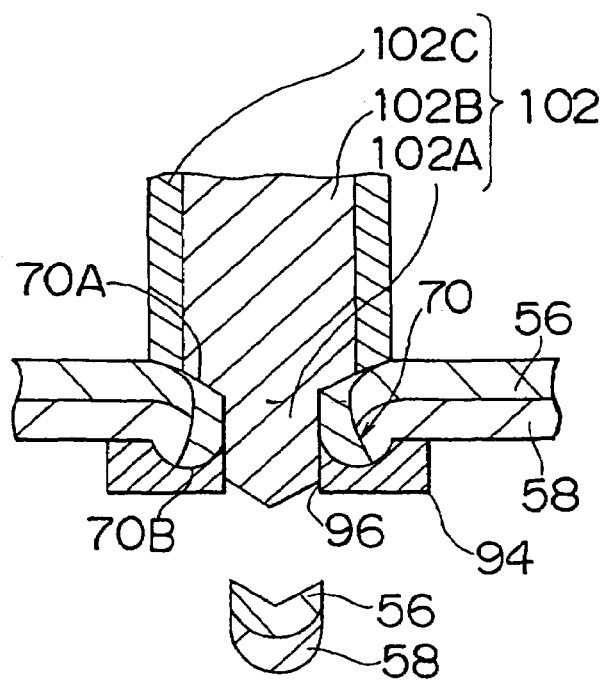
FIG. 21B is a side cross-sectional view showing the state in which the rivet inserting operation using the riveting apparatus and riveting method of FIG. 21A has been completed.

As shown in FIG. 21A, in the present embodiment, the rivet body 70 as a whole has a cylindrical shape, and a punch 102 for driving the rivet body 70 into a workpiece (56, 58) is of a passing-through type. A distal end portion of the punch 102 provides an inner guide portion 102A for holding the rivet body 70. The inner guide portion 102A has a diameter R1 that is smaller than the diameter R2 of a load transmitting portion (main body) 102B (R1<R2). The diameter R2 of the load transmitting portion 102B is substantially equal to the outer diameter R3 of the rivet body 70 (R2=R3).

In addition, an outer guide portion 102C is provided on the outer periphery of the load transmitting portion 102B of the punch 102 such that the outer guide portion 102C can move relative to the load transmitting portion 102B in the rivet-driving direction (direction of arrow C in FIG. 21A), and the rivet body 70 can be supported between the inner guide portion 102A and the outer guide portion 102C.

On the other hand, a die 94 for supporting the plates 56 and 58 is formed with a punching hole 96 that is opposed to the inner guide portion 102A of the punch 102. With this arrangement, driving of the rivet body 70 into the workpiece 56, 58 and punching-out of portions of the plates 56, 58 located within the cylindrical rivet body 70 can be accomplished only by movement of the punch 102 in the rivet-driving direction (direction of arrow C in FIG. 21A), i.e., one reciprocating movement.

Next, a riveting method in the present embodiment will be explained. In the present embodiment, as shown in FIGS. 21A and 21B, a step of driving the rivet body 70 into the plates 56 and 58 by the punch 102, a step of deforming the axially opposite end portions 70A and 70B of the rivet body 70, and a step of punching out portions of the plates 56 and 58 located within the cylindrical rivet body 70 are carried out by one reciprocating movement of the punch 102 in the rivet-driving direction (direction of arrow C in FIG. 21A).

The effects of the present embodiment will be now explained. In the present embodiment, since the rivet body 70 is supported by the inner guide portion 62A and the outer guide portion 62C of the punch 102, the rivet body 70 can be driven into the plates 56, 58 while the axially middle portion of the rivet body 70 is unlikely to be deformed. Further, as shown in FIG. 21B, the opposite ends 70A and 70B of the rivet body 70 can be effectively deformed by the punch 102 and the die 94 formed with the punching hole 96. Thus, the rivet body 70 can be driven into the workpiece with improved efficiency and ease, while assuring desired deformation characteristics and sufficiently large fastening force.

Furthermore, in the present embodiment, joining the plates 56 and 58 together by the rivet body 70 and punching-out of the plates 56, 58 located inside the rivet body 70 can be accomplished in one step, thus assuring an improved efficiency.

While some embodiments of the present invention have been described in detail, for illustrative purpose only, the present invention is not limited to details of these embodiments, but may be embodied with various changes, modifications and/or improvements, without departing from the scope of the present invention. For example, the present invention can also be applied to the case where three or more plates are fastened or joined to each other.

A rivet structure according to the fifth embodiment of the first aspect of the present invention will be explained with reference to FIG. 22 to FIG. 25.

Figure 23:
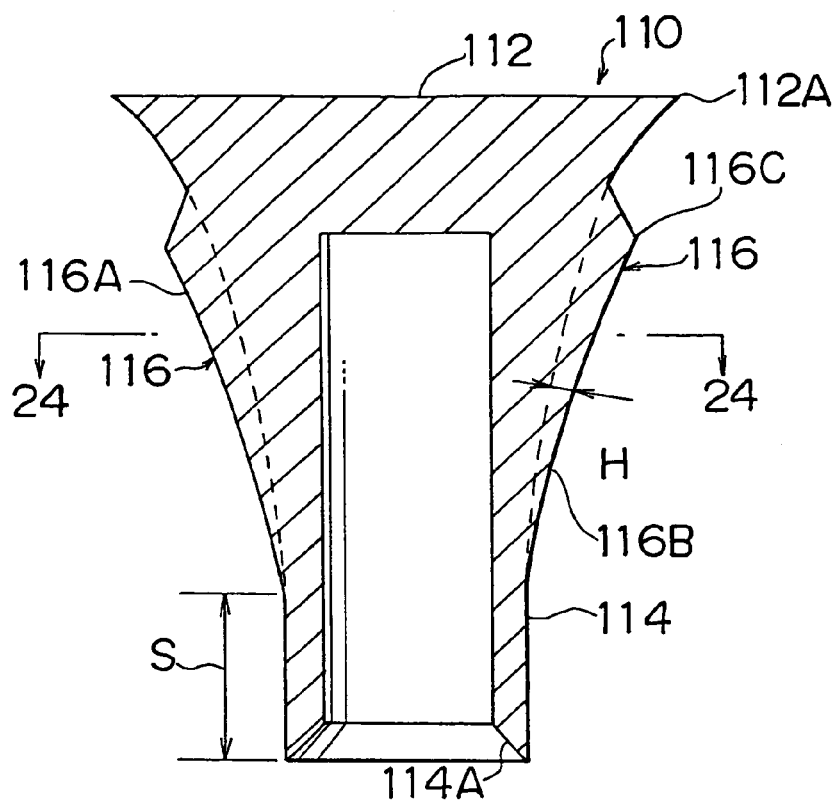
FIG. 23 is a side cross-sectional view of the rivet structure shown in FIG. 22.

As shown in FIG. 23, a rivet 110 of the present embodiment is a hollow rivet consisting of a head portion 112, and a cylindrical portion 114 extending from a lower surface of the head portion 112. A distal end portion 114A of the cylindrical portion 114 is tapered inwards such that the outer circumferential surface and the axial end face forms an acute angle therebetween, to provide a sharp edge at the outer periphery.

Figure 22:
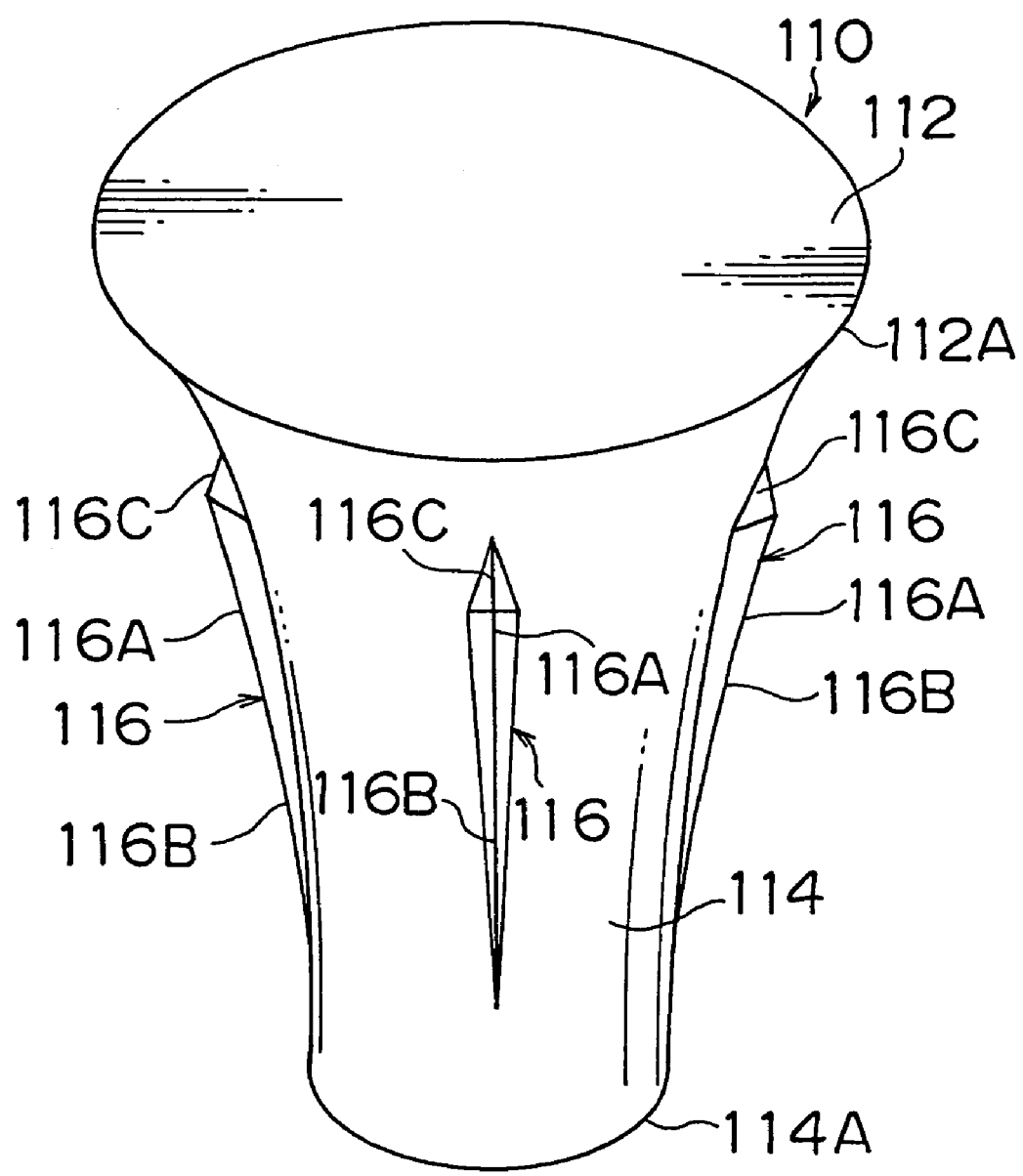
FIG. 22 is a perspective view showing a rivet structure according to the fifth embodiment of the first aspect of the present invention.
Figure 24:
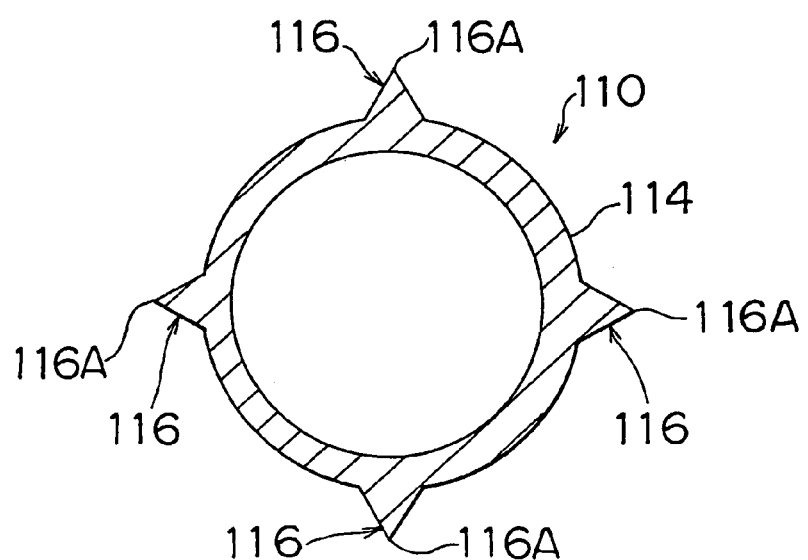
FIG. 24 is a cross-sectional view taken along line 24—24 in FIG. 23.
Figure 25:
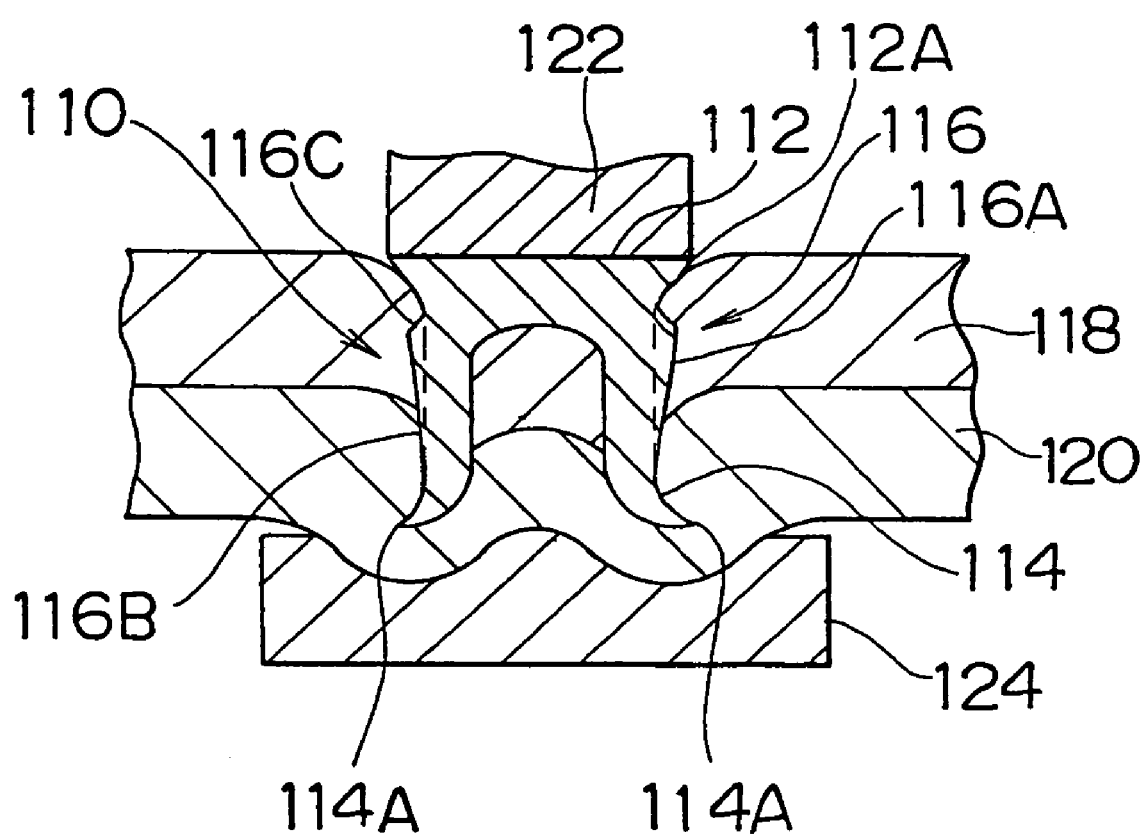
FIG. 25 is a side cross-sectional view showing the rivet structure of FIG. 22 when it is being driven or inserted into a workpiece.

As shown in FIG. 22, the cylindrical portion 114 of the rivet 110 of the present embodiment is formed on its outer circumferential surface with four elongate projections 116 that extend in the longitudinal direction of the cylindrical portion 114. As shown in FIG. 24, the four elongate projections 116 are formed on the outer circumferential surface of the cylindrical portion 114 at angular intervals of 90° as measured in its circumferential direction. Each of the elongate projections 116 has an isosceles triangular cross section in a plane perpendicular to the longitudinal direction of the cylindrical portion 114 so that apexes 116A of the projections 116 easily bite into or engage with plates 118 and 120 as a workpiece to be fastened (as shown in FIG. 25).

As shown in FIG. 23; each of the elongate projections 116 includes an upwardly inclined portion 116B that is closer to the distal end of the cylindrical portion 114 of the rivet 110. The height H of the upwardly inclined portion 116B as measured from the outer circumferential surface of the cylindrical portion 114 is gradually increased from the distal end of the cylindrical portion 114 toward the head portion 112 of the rivet 110. When the cylindrical portion 114 of the rivet 110 is inserted from its distal end into the plates 118 and 120 for engagement therewith (as shown in FIG. 25), the resistance force which the cylindrical portion 114 receives from the plates 118 and 120 is initially small, but is gradually increased with an increase in the height of the upwardly inclined portion 116B.

Each of the elongate projections 116 includes a downwardly inclined portion 116C that is closer to the head portion 112 of the rivet 110. The height H of the downwardly inclined portion 116C as measured from the outer circumferential surface of the cylindrical portion 114 is gradually reduced toward the head portion 112 of the rivet 110. The downwardly inclined portion 116C thus formed prevents a clearance or gap from being formed between the elongate projections 116 and the plate 120.

Also, the elongate projections 116 are formed at positions that are spaced a certain distance S away from the distal end 114A of the cylindrical portion 114, so that the elongate projections 116 do not interfere with the plate 118 in the initial period of an operation to drive the rivet 110 into the workpiece.

The effects of the present embodiment will be now explained. In the present embodiment, as shown in FIG. 25, when the rivet 110 is driven into the plates 118 and 120 as a workpiece to be fastened, by means of the punch 122 and the die 124, the elongate projections 116 bite into and engage with the plates 118 and 120. As a result, the fastening strength between the rivet 110 and the plates 118 and 120, especially a fastening strength against the rotation direction of the rivet 110 is enhanced. In the present embodiment, since each of the elongate projections 116 is formed on at a position that is spaced a certain distance S away from the distal end 114A of the cylindrical portion 114, the elongate projections 116 do not interfere with the plate 118 in the initial period of the operation to drive the rivet 110 into the workpiece. Further, the height H of the upwardly inclined portion 116B as measured from the outer circumferential surface of the cylindrical portion is gradually increased from one end of the portion 116B closer to the distal end 114A, to the other end closer to the head portion 112 of the rivet 110. When the cylindrical portion 114 of the rivet 110 bites into the plates 118 and 120, therefore, the resistance force which the cylindrical portion 114 receives from the plates 118 and 120 is initially small, but is then gradually increased. Accordingly, the rivet 110 can be more easily driven into the workpiece with an improved efficiency. Furthermore, as shown in FIG. 25, the distal end portion 114A of the cylindrical portion 114 is easily deformed radially outwards without fail, thus assuring improved fastening or joining strength.

Further, in the present embodiment, the height H of the upwardly inclined portion 116B as measured from the outer circumferential surface of the cylindrical portion 114 is gradually increased from one end thereof closer to the distal end 114A to the other end closer to the head portion 112 of the rivet 110. Therefore, a portion of the cylindrical portion 14 which is likely to be bent and deformed during insertion of the rivet into the workpiece, i.e., a longitudinally intermediate portion of the cylindrical portion 14, can be effectively reinforced by the elongate protrusions 116. For this reason as well, the rivet 110 can be driven into the workpiece with improved efficiency and ease. Further, in the present embodiment, each of the elongate projections 116 includes the downwardly inclined portion 116C that is formed on the side of the upwardly inclined portion 116B closer to the rivet head, such that its height H as measured from the outer circumferential surface of the cylindrical portion is gradually reduced toward the rivet head. With this arrangement, the downwardly inclined portion 116C prevents a clearance or gap from being formed between the projection 116 and the plate 118, and thus the fastening strength is further enhanced. Moreover, a portion of the plate 118 is plastically deformed and enters between the outer periphery 112A of the head portion 112 and the downwardly inclined portion 116C of the rivet 110, and this portion of the plate 118 meshes or engages with the downwardly inclined portion 116C, thereby making it difficult to pull out the rivet 110 from the plates 118, 120.

Further, in the present embodiment, each of the elongate projections 116 has an isosceles triangular cross section in a plane perpendicular to the longitudinal direction of the cylindrical portion 114 of the rivet 110. When the rivet 110 is driven into the workpiece, therefore, apexes 116A of the projections 116 are likely to bite into and engage with the plates 118 and 120. Thus, the rivet 110 can be smoothly driven into the plates 118, 120 with improved efficiency and ease.

While the four elongate projections 116 are formed on the outer circumferential surface of the cylindrical portion 114 at equal angular intervals of 90° in the circumferential direction in the illustrated embodiment as shown in FIG. 24, the number and positions of the elongate projections 116 are not limited to those as shown in FIG. 24, but may be changed. For example, one elongate projection 116 may be formed on the outer circumferential surface of the cylindrical portion 114, or a plurality of elongate projections 116 may be formed on the outer circumferential surface of the cylindrical portion 114 at equal angular intervals in the circumferential direction.

Figure 26A:
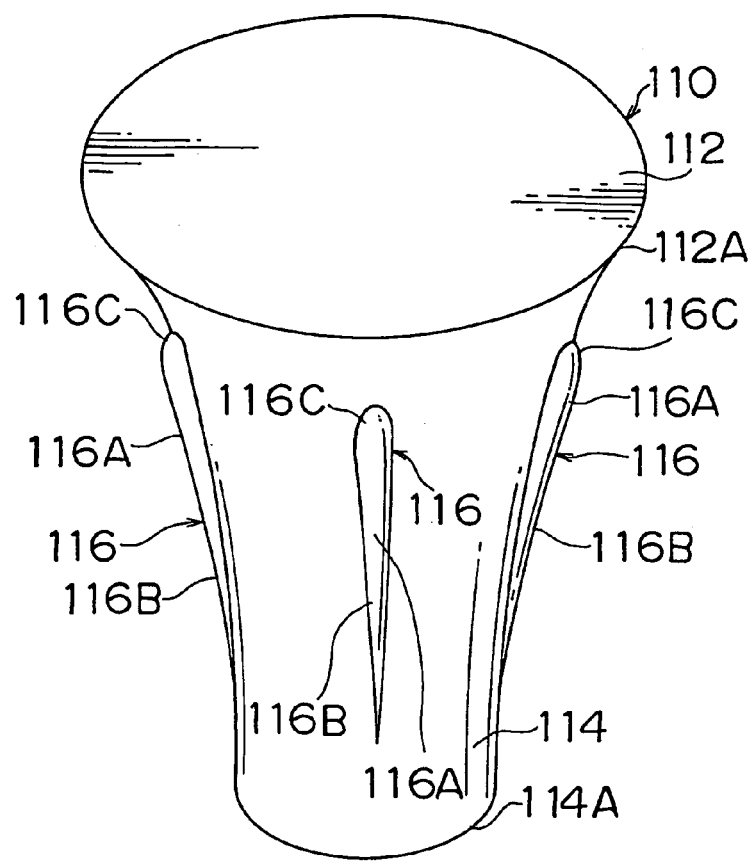
FIG. 26A is a perspective view showing a rivet structure as a modified example of the fifth embodiment of FIG. 22.
Figure 26B:
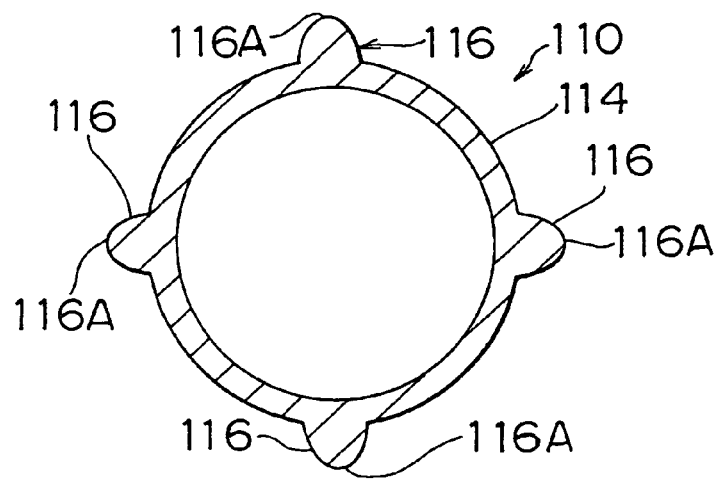
FIG. 26B is a cross-sectional view corresponding to that of FIG. 24, showing the rivet structure according to the modified example of FIG. 26A.

Further, while each of the elongate projections 116 has an isosceles triangular cross section perpendicular to the longitudinal direction of the cylindrical portion 114 in the illustrated embodiment as shown in FIG. 24, the cross-sectional shape of the projection 116 is not limited to an isosceles triangle, but may be any other type of generally triangular shape. Also, the apex 116A of the projection 116 may be formed into an arc shape as shown in FIGS. 26A and 26B.

Figure 27:
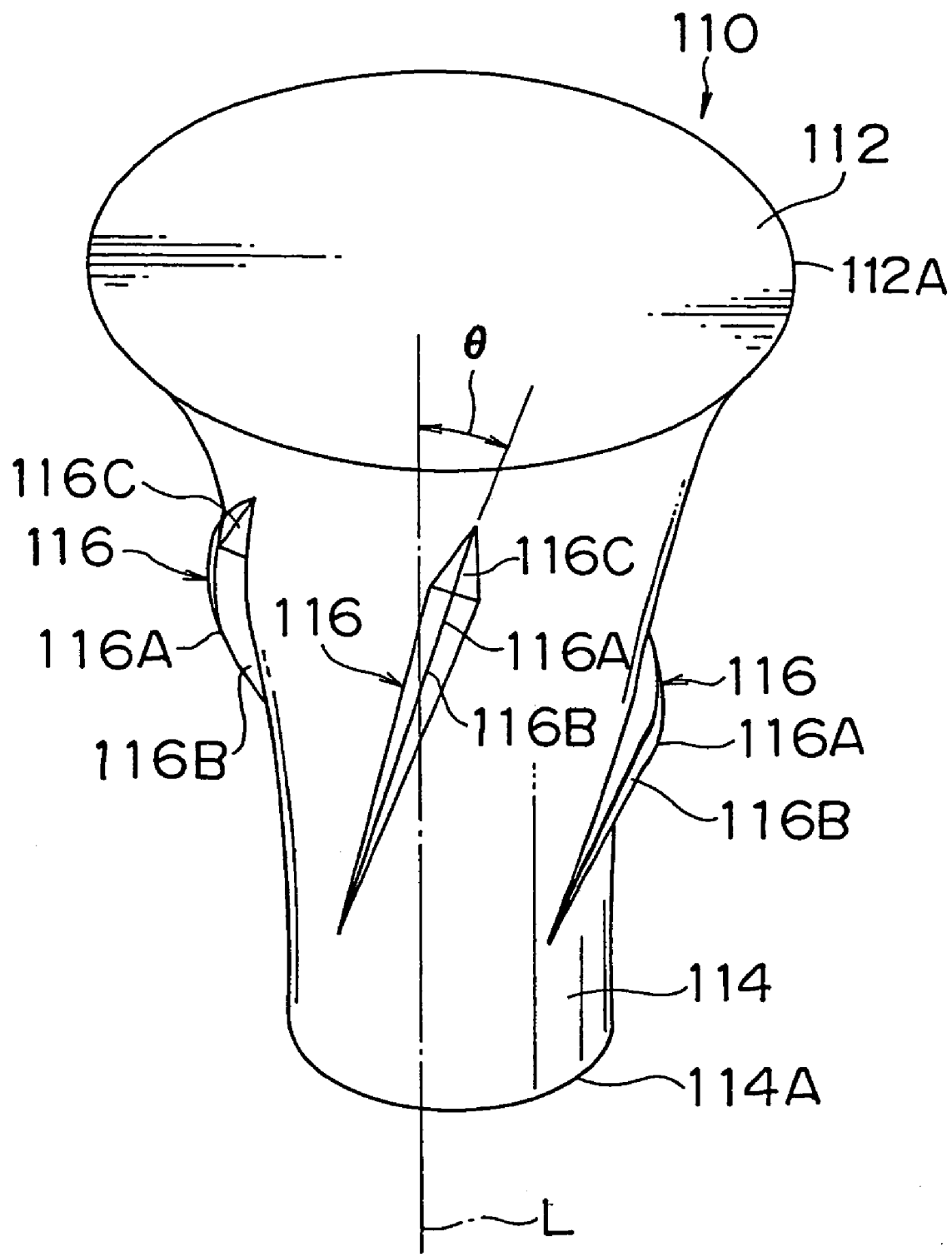
FIG. 27 is a perspective view showing a rivet structure according to the sixth embodiment of the first aspect of the present invention.

Next, a rivet structure according to the sixth embodiment of the first aspect of the present invention will be explained with reference to FIG. 27. In FIG. 27, the same reference numeral as used in FIG. 22 illustrating the fifth embodiment are used for identifying corresponding elements, of which no detailed description will be provided.

As shown in FIG. 27, the elongate projections 116 of the rivet 110 are inclined a certain angle θ with respect to the longitudinal direction (axial direction L) of the cylindrical portion 114. With this arrangement, the rivet 110 can be prevented from being pulled out in the longitudinal direction of the cylindrical portion 114, due to engagement between the projections 116 and the plates 118, 120 (refer to FIG. 25).

Thus, the present embodiment provides the following effect in addition to the effects of the fifth embodiment; the rivet 110 can be prevented from being pulled out due to the engagement between the projections 116 that are inclined with respect to the longitudinal direction of the cylindrical portion 114, and the plates 118, 120, thus assuring further improved fastening or joining strength.

Figure 28:
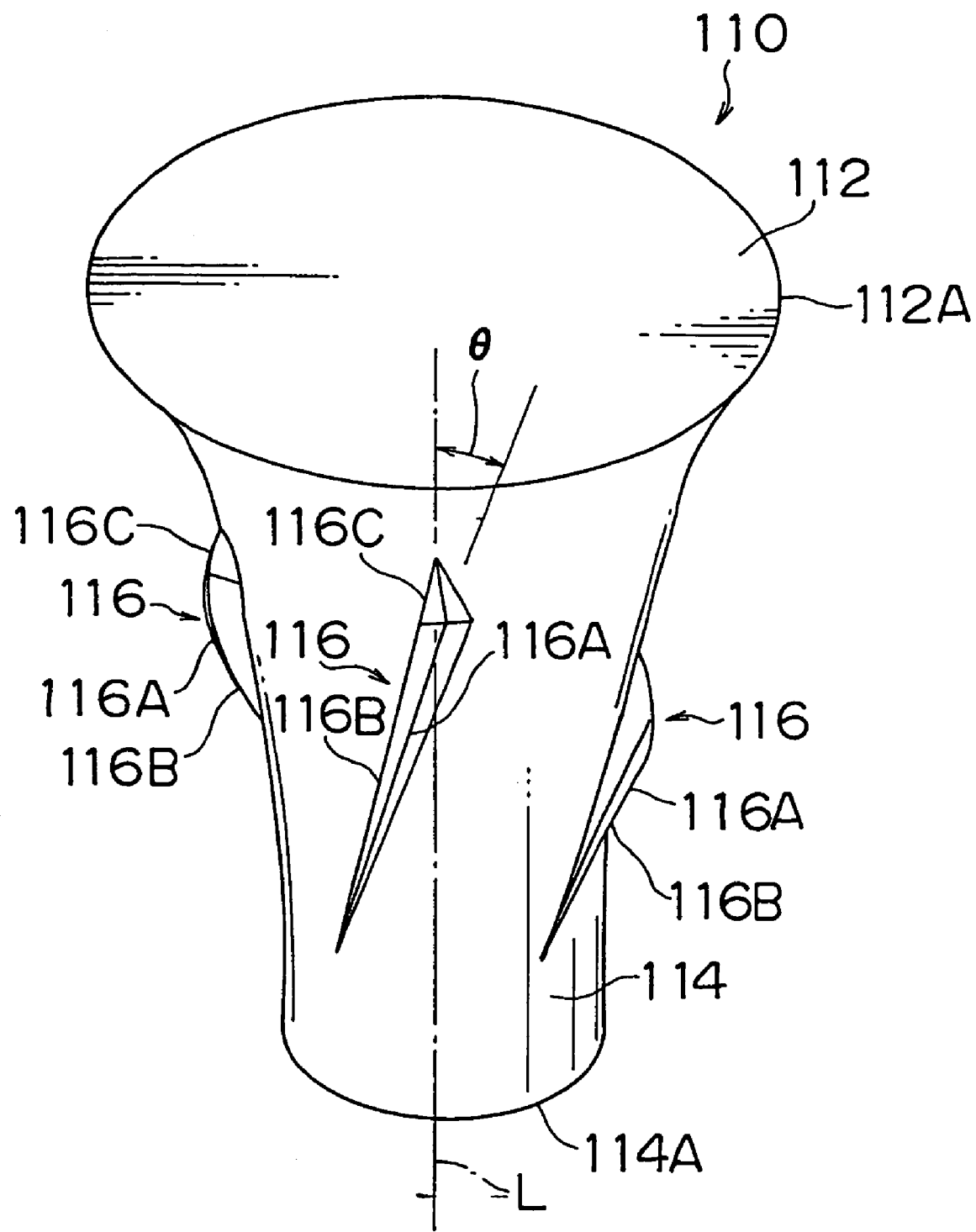
FIG. 28 is a perspective view showing a rivet structure according to the seventh embodiment of the first aspect of the present invention.

Next, a rivet structure according to the seventh embodiment of present invention will be explained with reference to FIG. 28. In FIG. 28, the same reference numeral as used in FIG. 22 illustrating the fifth embodiment are used for identifying corresponding elements, of which no detailed description will be provided.

As shown in FIG. 28, the upwardly inclined portions 116B of the elongate projections 116 of the rivet 110 are inclined a predetermined angle θ with respect to the longitudinal direction (axial direction L) of the cylindrical portion 114A, and the downwardly inclined portions 116C of the projections stripes 116 extend in parallel with the longitudinal direction (axial direction L) of the cylindrical portion 114A. With this arrangement, the rivet 110 can be prevented from being pulled out in the longitudinal direction of the cylindrical portion 114A, due to engagement between the plates 118, 120 and the upwardly inclined portions 116B of the projections 116 that are inclined with respect to the longitudinal direction of the cylindrical portion 114A (refer to FIG. 25).

Thus, the present embodiment provides the following effect in addition to the effects of the fifth embodiment; the rivet 110 can be prevented from being pulled out due to the engagement between the plates 118, 120 and the upwardly inclined portions 116B of the projections 116 that are inclined with respect to the longitudinal direction of the cylindrical portion 114, thus assuring further improved fastening or joining strength.

Further, since the downwardly inclined portions 116C of the elongate projections 116 extend in parallel with the longitudinal direction (axial direction L) of the cylindrical portion 114A, a gap or clearance can be prevented from being formed between the downwardly inclined portions 116C and the plate 120.

Figure 29:
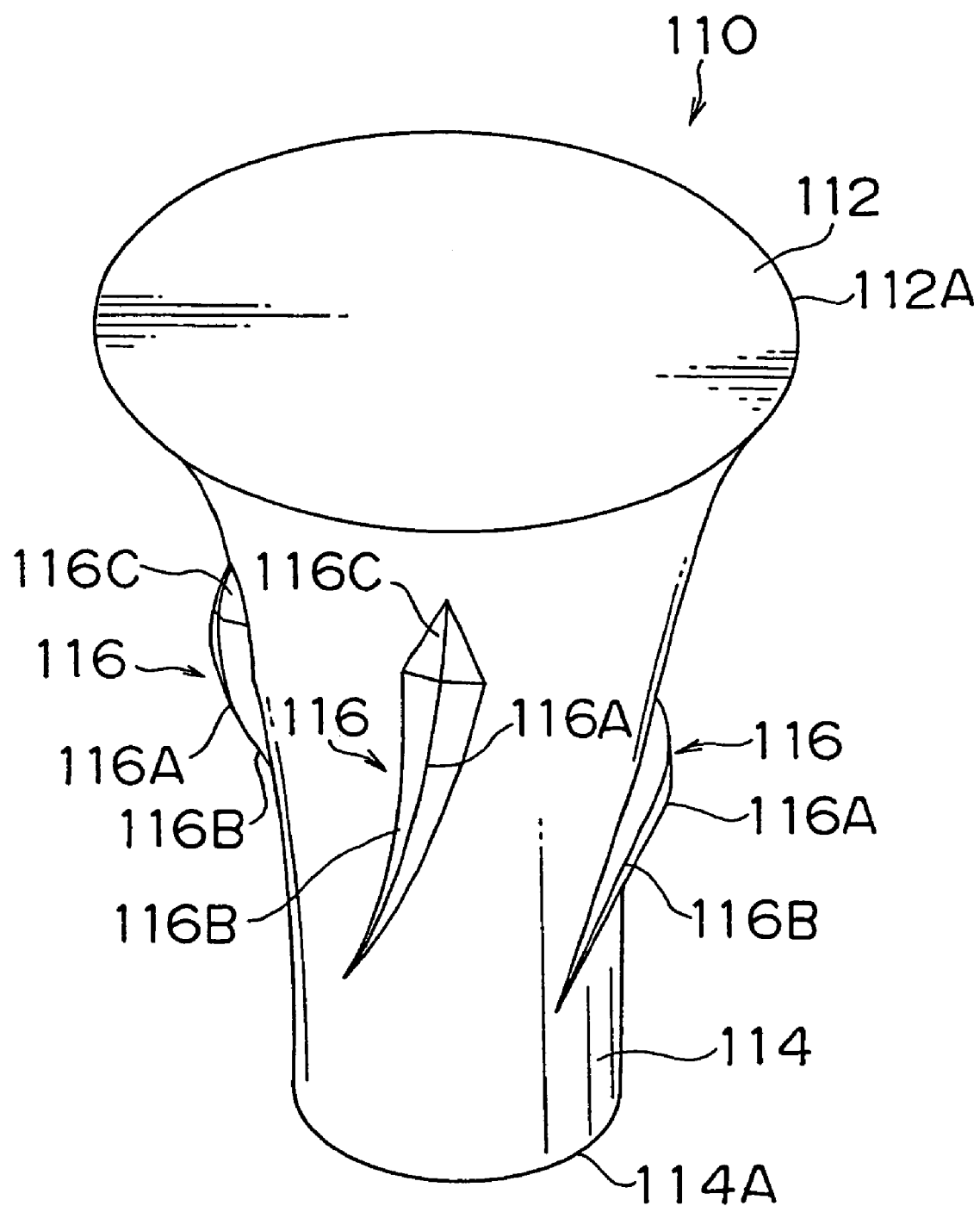
FIG. 29 is a perspective view showing a rivet structure as a modified example of the seventh embodiment of FIG. 28.

While each of the elongate projections 116 of the rivet 110 are bent at a boundary between the upwardly inclined portion 116B and the downwardly inclined portion 116C as shown in FIG. 28, the upwardly inclined portion 116B of the projection 116 may be inclined with respect to the longitudinal direction of the cylindrical portion 114A by forming the projection 116 into a curved shape, as shown in FIG. 29.

Figure 30A:
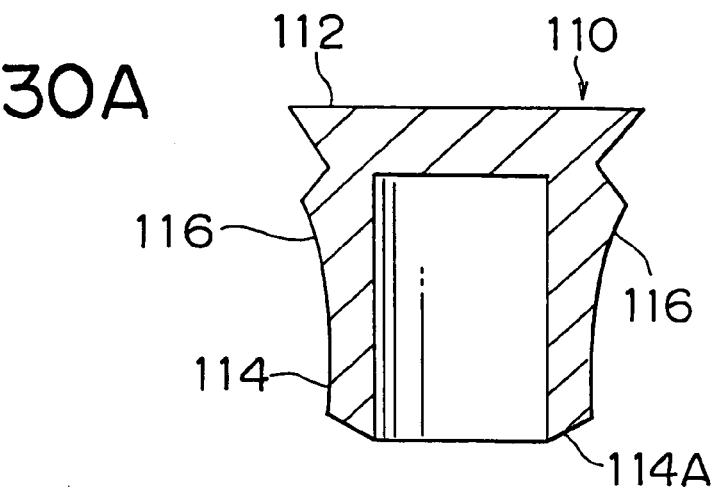
FIGS. 30A to 30F are side cross-sectional views showing rivet structures according to other embodiments of the present invention.
Figure 30B:
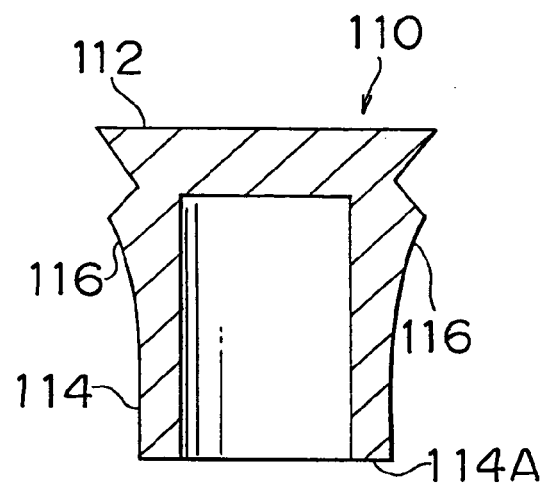
Figure 30C:
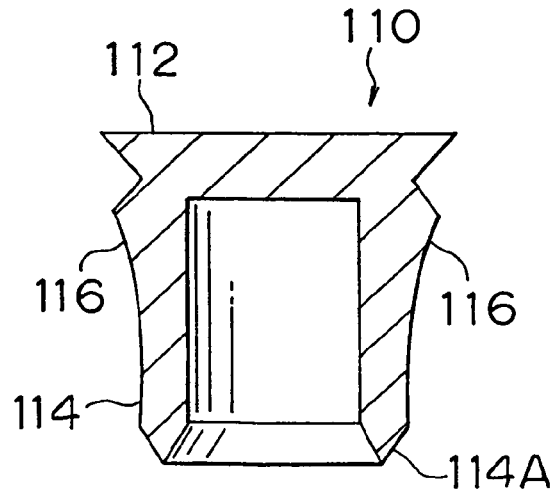

While some embodiments of the present invention have been described in detail, for illustrative purpose only, the present invention is not limited to details of these embodiments, but may be embodied with various changes, modifications and/or improvements, without departing from the scope of the present invention. In the illustrated embodiments, the distal end portion 114A of the cylindrical portion 114 of the rivet 110 is tapered radially intwards such that the axial end face and the outer circumferential surface of the cylindrical portion 114 forms an acute angle, to provide a sharp edge at the outer periphery. Rather, the distal end portion 114A of the cylindrical portion 114 of the rivet 110 may be tapered radially outwards such that the inner circumferential surface and the axial end face form an acute angle therebetween, to thus provide a sharp edge at the inner periphery. Also, as shown in FIG. 30B, the distal end of the cylindrical portion 114 of the rivet 110 may have a flat surface that is perpendicular to the direction in which the rivet 110 is driven into a workpiece. Further, as shown in FIG. 30C, the distal end portion 114A of the cylindrical portion 114 of the rivet 110 may have a cross section having an angular shape pointed in the rivet-driving direction.

Figure 30D:
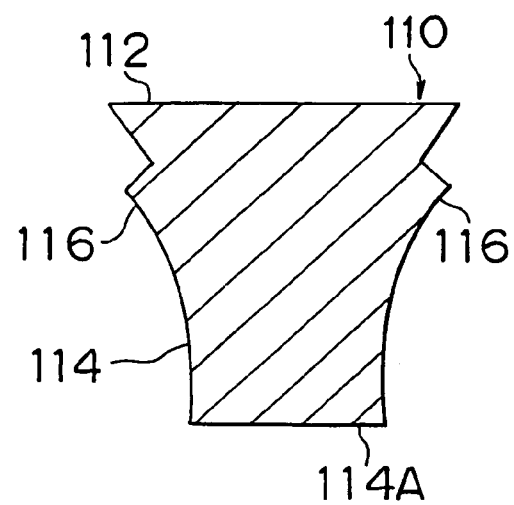
Figure 30E:
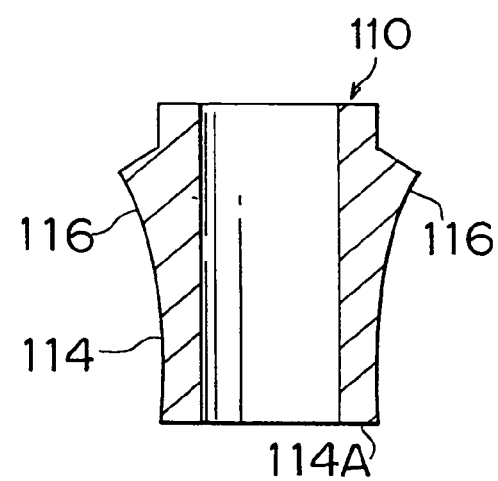
Figure 30F:
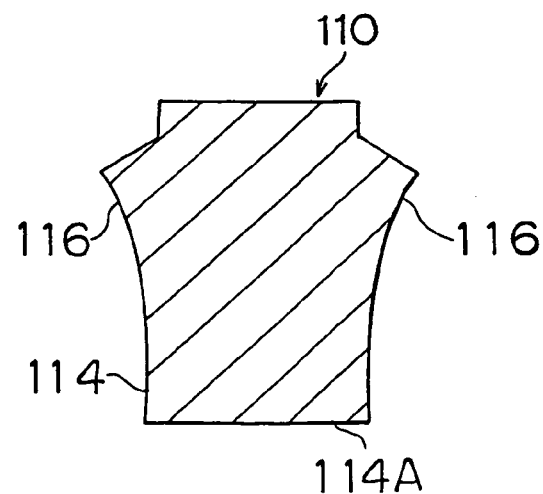

Although the cylindrical portion 114 of the rivet 110 has a hollow structure in the illustrated embodiments, the rivet 110 may have a solid structure including a rod portion (114) that extends in the axial direction of the rivet 110, as shown in FIG. 30D. The rivet 110 may be formed into a cylindrical shape as shown in FIG. 30E, or a columnar shape as shown in FIG. 30F. Further, the present invention can also be applied to the case where three or more plates are fastened or joined together.

The invention claimed is:

1. A rivet comprising:
   axially opposite end portions at least one of which is more likely to be deformed radially outwards than a remaining portion thereof, said remaining portion being more resistant to a load applied in an axial direction of the rivet than said axially opposite end portion;
   a head portion including one of said axially opposite end portions, wherein a recess is formed in the head portion to be open to a top surface of the head portion; and
   a cylindrical portion including the other of the axially opposite end portions, wherein a bore is formed in the cylindrical portion, and a bore projection is formed on a bottom wall of the bore.

2. A riveted joint structure including a rivet as defined in claim 1 for fastening a workpiece.

3. A riveted joint structure including a rivet as defined in claim 1 for fastening a workpiece, wherein the cylindrical portion of the rivet is adapted to splay radially outwards due to a load applied in the axial direction to a bottom wall of the recess.

4. A riveted joint structure including a rivet as defined in claim 1 for fastening a workpiece, wherein the bottom wall of the recess is adapted to be punched out such that the recess cooperates with the bore of the cylindrical portion to form a through-hole that extends over the entire axial length of the rivet.

5. A rivet according to claim 1, wherein the bore projection is capable of increasing an opening angle formed by deformation of the other of the axially opposite end portions of the cylindrical portion in response to the load.

6. A riveted joint structure including a rivet as defined in claim 5 for fastening a workpiece, wherein the bottom wall of the recess is capable of being punched out such that the recess cooperates with the bore of the cylindrical portion to form a through-hole that extends over the entire axial length of the rivet.

* * * * *